United States Patent
Papasakellariou

(10) Patent No.: US 12,273,870 B2
(45) Date of Patent: *Apr. 8, 2025

(54) ACKNOWLEDGEMENT REPORT FOR RECEPTION OF CONTROL INFORMATION

(71) Applicant: Samsung Electronics Co., Ltd., Suwon-si (KR)

(72) Inventor: Aris Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/422,987

(22) Filed: Jan. 25, 2024

(65) Prior Publication Data

US 2024/0179697 A1   May 30, 2024

Related U.S. Application Data

(63) Continuation of application No. 17/447,190, filed on Sep. 8, 2021, now Pat. No. 11,917,607.

(Continued)

(51) Int. Cl.
*H04W 72/121* (2023.01)
*H04L 1/1607* (2023.01)
(Continued)

(52) U.S. Cl.
CPC ......... *H04W 72/121* (2013.01); *H04L 1/1671* (2013.01); *H04L 5/0055* (2013.01);
(Continued)

(58) Field of Classification Search
CPC ........... H04W 72/121; H04W 72/1273; H04W 72/23; H04W 72/569; H04L 1/1671;
(Continued)

(56) References Cited

U.S. PATENT DOCUMENTS

2017/0367046 A1   12/2017   Papasakellariou
2019/0253308 A1   8/2019    Huang
(Continued)

FOREIGN PATENT DOCUMENTS

WO   2020031918 A1   2/2020

OTHER PUBLICATIONS

"5G; NR; Physical channels and modulation (3GPP TS 38.211 version 16.2.0 Release 16)", ETSI TS 138 211 V16.2.0, Jul. 2020, 136 pages.

(Continued)

*Primary Examiner* — Sharmin Chowdhury

(57) ABSTRACT

Methods and apparatuses for processing an acknowledgement report for reception of control information. A method for a user equipment (UE) to receive physical downlink control channels (PDCCHs) includes determining a prioritization for receiving the PDCCHs and receiving the PDCCHs based on the prioritization. PDCCH receptions for a first search space set (SSS) are prioritized over PDCCH receptions for a second SSS or a third SSS. The PDCCH receptions for the second SSS are prioritized over the PDCCH receptions for the third SSS based on a configuration. The PDCCH receptions for the first SSS include a first downlink control information (DCI) format. The PDCCH receptions for the second SSS include a second DCI format that schedules a groupcast physical downlink shared channel (PDSCH) reception. The PDCCH receptions for the third SSS include a third DCI format that schedules a unicast PDSCH reception.

17 Claims, 12 Drawing Sheets

Related U.S. Application Data

(60) Provisional application No. 63/081,554, filed on Sep. 22, 2020.

(51) Int. Cl.
  *H04L 5/00* (2006.01)
  *H04W 72/1273* (2023.01)
  *H04W 72/23* (2023.01)
  *H04W 72/566* (2023.01)

(52) U.S. Cl.
  CPC ....... *H04W 72/1273* (2013.01); *H04W 72/23* (2023.01); *H04W 72/569* (2023.01)

(58) Field of Classification Search
  CPC ... H04L 5/0055; H04L 1/1854; H04L 1/1861; H04L 1/1896; H04L 5/0064; H04L 5/0053
  See application file for complete search history.

(56) References Cited

U.S. PATENT DOCUMENTS

| | | | |
|---|---|---|---|
| 2019/0387501 A1 | 12/2019 | Park | |
| 2020/0106566 A1 | 4/2020 | Yeo et al. | |
| 2021/0014647 A1 | 1/2021 | Takeda et al. | |
| 2021/0112500 A1 | 4/2021 | Takeda | |
| 2021/0250958 A1 | 8/2021 | Liu | |
| 2021/0328725 A1* | 10/2021 | Jassal | H04L 1/1614 |
| 2022/0053470 A1* | 2/2022 | Chen | H04W 76/28 |
| 2022/0053479 A1* | 2/2022 | Kim | H04L 5/0082 |
| 2022/0248396 A1 | 8/2022 | Zhang et al. | |
| 2022/0256504 A1 | 8/2022 | Lin | |
| 2022/0360950 A1 | 11/2022 | Li et al. | |
| 2022/0377585 A1 | 11/2022 | Chen | |
| 2023/0047407 A1* | 2/2023 | Li | H04B 7/0639 |
| 2023/0180244 A1 | 6/2023 | Kou | |
| 2023/0199751 A1* | 6/2023 | Huang | H04W 52/0229 370/329 |
| 2023/0327838 A1 | 10/2023 | Fan et al. | |
| 2024/0259141 A1 | 8/2024 | Park et al. | |

OTHER PUBLICATIONS

"5G; NR; Multiplexing and channel coding (3GPP TS 38.212 version 16.2.0 Release 16)", ETSI TS 138 212 V16.2.0, Jul. 2020, 154 pages.
"5G; NR; Physical layer procedures for control (3GPP TS 38.213 version 16.2.0 Release 16)", ETSI TS 138 213 V16.2.0, Jul. 2020, 180 pages.
"5G; NR; Physical layer procedures for data (3GPP TS 38.214 version 16.2.0 Release 16)", ETSI TS 138 214 V16.2.0, Jul. 2020, 167 pages.
"5G; NR; Medium Access Control (MAC) protocol specification (3GPP TS 38.321 version 16.1.0 Release 16)", ETSI TS 138 321 V16.1.0, Jul. 2020, 153 pages.
"5G; NR; Radio Resource Control (RRC); Protocol specification (3GPP TS 38.331 version 16.1.0 Release 16)", ETSI TS 138 331 V16.1.0, Jul. 2020, 886 pages.
International Search Report and Written Opinion dated Dec. 20, 2021 regarding International Application No. PCT/KR2021/012836, 7 pages.
Oppo, "Group scheduling for NR Multicast and Broadcast Services", 3GPP TSG RAN WG1 #102-e, R1-2006013, Aug. 2020, 3 pages.
CMCC, "Discussion on group scheduling mechanisms in NR MBS", 3GPP TSG RAN WG1 #102-e, R1-2006233, Aug. 2020, 9 pages.
Vivo, "Discussion on mechanisms to support group scheduling for RRC_Connected UEs", 3GPP TSG RAN WG1 #102-e, R1-2005406, Aug. 2020, 3 pages.
Indian Patent Office, Examination Report dated Sep. 5, 2023 regarding Application No. 202337019339, 7 pages.
Extended European Search Report issued Aug. 21, 2024 regarding Application No. 21872863.2, 12 pages.

* cited by examiner

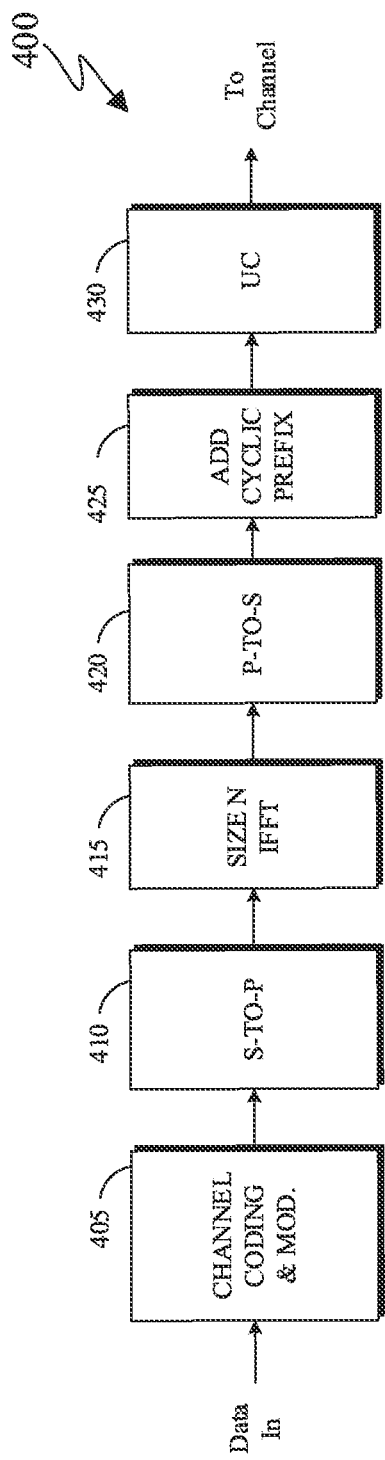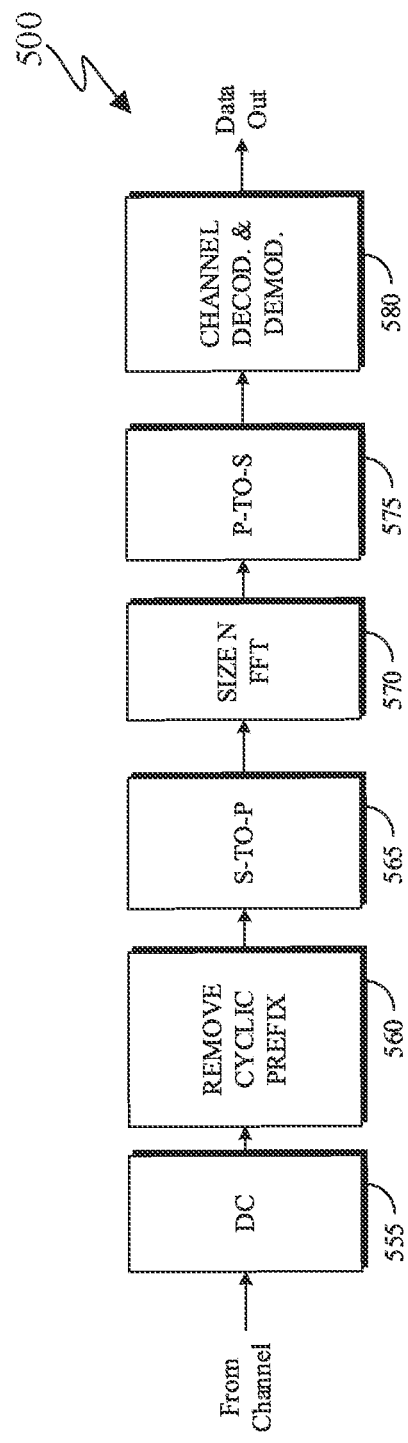

ACKNOWLEDGEMENT REPORT FOR RECEPTION OF CONTROL INFORMATION

CROSS-REFERENCE TO RELATED APPLICATION AND CLAIM OF PRIORITY

This application is a continuation of U.S. patent application Ser. No. 17/447,190, filed on Sep. 8, 2021, which claims priority under 35 U.S.C. § 119(e) to U.S. Provisional Patent Application No. 63/081,554 filed on Sep. 22, 2020. The above-identified provisional patent application is hereby incorporated by reference in its entirety.

TECHNICAL FIELD

The present disclosure relates generally to wireless communication systems and, more specifically, the present disclosure relates to acknowledgement reports for reception of control information.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to reception of control channels and data channels and to acknowledgement reports in control channels in response to reception of control information or data information in respective control channels or data channels.

In one embodiment, a method for a user equipment (UE) to receive physical downlink control channels (PDCCHs) is provided. The method includes determining a prioritization for receiving the PDCCHs and receiving the PDCCHs based on the prioritization. PDCCH receptions for a first search space set (SSS) are prioritized over PDCCH receptions for a second SSS or PDCCH receptions for a third SSS. The PDCCH receptions for the second SSS are prioritized or deprioritized over the PDCCH receptions for the third SSS based on a configuration. The PDCCH receptions for the first SSS are according to a common search space (CSS) and include a first downlink control information (DCI) format. The PDCCH receptions for the second SSS are according to the CSS and include a second DCI format that schedules a groupcast physical downlink shared channel (PDSCH) reception. The PDCCH receptions for the third SSS are according to a UE-specific search space (USS) and include a third DCI format that schedules a unicast PDSCH reception.

In another embodiment, a UE is provided. The UE includes a processor configured to determine a prioritization for reception of PDCCHs and a transceiver that is operably connected to the processor and configured to receive the PDCCHs based on the prioritization. PDCCH receptions for a first SSS are prioritized over PDCCH receptions for a second SSS or PDCCH receptions for a third SSS. The PDCCH receptions for the second SSS are prioritized or deprioritized over the PDCCH receptions for the third SSS based on a configuration. The PDCCH receptions for the first SSS are according to a CSS and include a first DCI format. The PDCCH receptions for the second SSS are according to the CSS and include a second DCI format that schedules a groupcast PDSCH reception. The PDCCH receptions for the third SSS are according to a USS and include a third DCI format that schedules a unicast PDSCH reception.

In yet another embodiment, a base station is provided. The base station includes a processor configured to determine a prioritization for transmission of PDCCHs and a transceiver that is operably connected to the processor and configured to transmit the PDCCHs based on the prioritization. PDCCH transmissions for a first SSS are prioritized over PDCCH transmissions for a second SSS or PDCCH transmissions for a third SSS. The PDCCH transmissions for the second SSS are prioritized or deprioritized over PDCCH transmissions for the third SSS based on a configuration. The PDCCH transmissions for the first SSS are according to a CSS and include a first DCI format. The PDCCH transmissions for the second SSS are according to the CSS and include a second DCI format that schedules a groupcast PDSCH transmission. The PDCCH transmissions for the third SSS are according to a USS and include a third DCI format that schedules a unicast PDSCH transmission.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 4 and 5 illustrate example wireless transmit and receive paths according to embodiments of the present disclosure;

DETAILED DESCRIPTION

Figure 1:
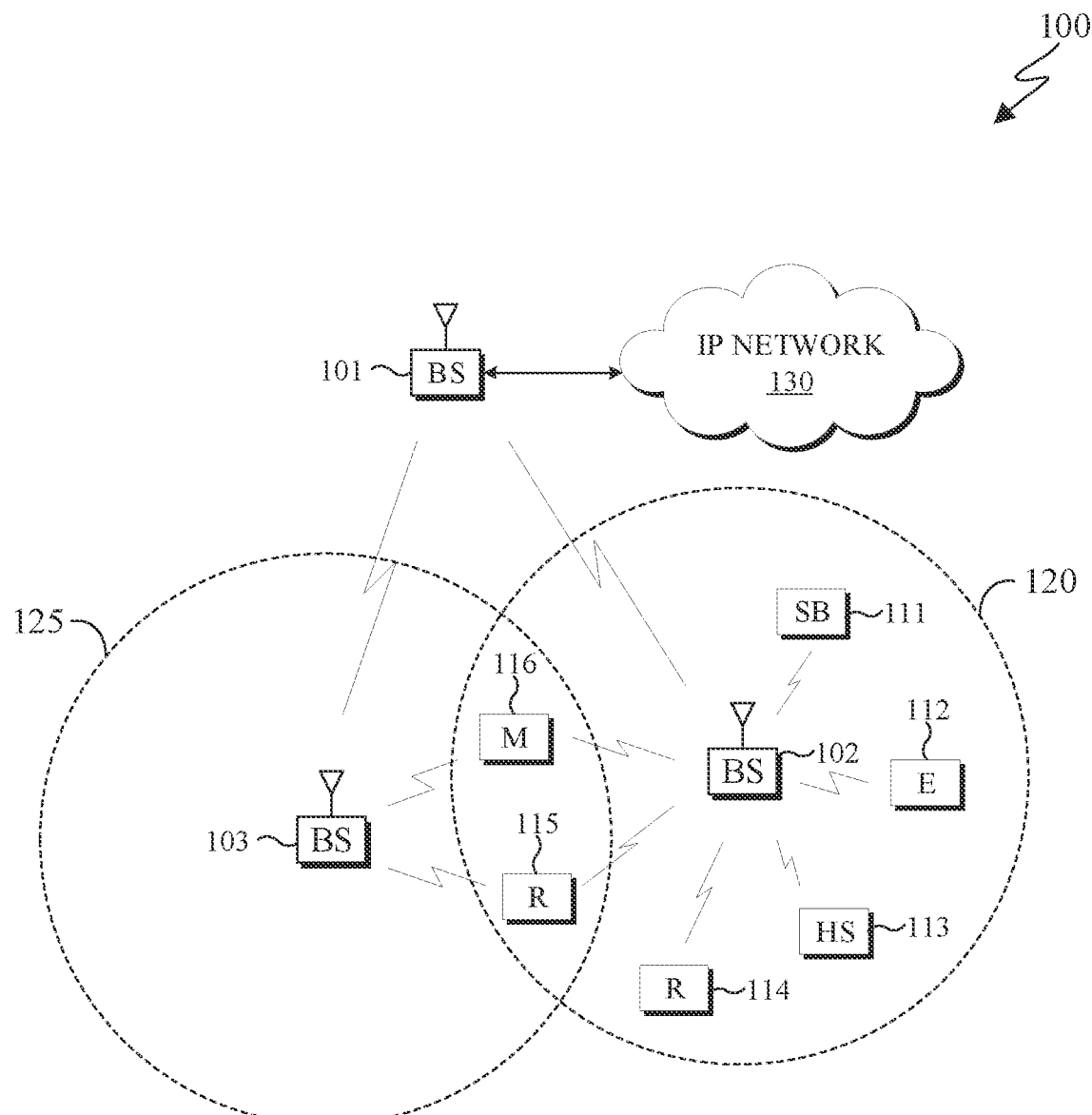
FIG. 1 illustrates an example wireless network according to embodiments of the present disclosure.

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents are hereby incorporated by reference into the present disclosure as if fully set forth herein: 3GPP TS 38.211 v16.2.0, "NR; Physical channels and modulation," 3GPP TS 38.212 v16.2.0, "NR; Multiplexing and Channel coding," 3GPP TS 38.213 v16.2.0, "NR; Physical Layer Procedures for Control," 3GPP TS 38.214 v16.2.0, "NR; Physical Layer Procedures for Data," 3GPP TS 38.321 v16.1.0, "NR; Medium Access Control (MAC) protocol specification," and 3GPP TS 38.331 v16.1.0, "NR; Radio Resource Control (RRC) protocol specification."

To meet the demand for wireless data traffic having increased since deployment of the fourth generation (4G) communication systems, efforts have been made to develop and deploy an improved 5th generation (5G) or pre-5G/NR communication system. Therefore, the 5G or pre-5G communication system is also called a "beyond 4G network" or a "post long term evolution (LTE) system."

The 5G communication system is considered to be implemented in higher frequency (mm Wave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Depending on the network type, the term 'base station' (BS) can refer to any component (or collection of components) configured to provide wireless access to a network, such as transmit point (TP), transmit-receive point (TRP), an enhanced base station (eNodeB or eNB), a gNB, a macrocell, a femtocell, a WiFi access point (AP), a satellite, or other wirelessly enabled devices. Base stations may provide wireless access in accordance with one or more wireless communication protocols, e.g., 5G 3GPP New Radio Interface/Access (NR), LTE, LTE advanced (LTE-A), High Speed Packet Access (HSPA), Wi-Fi 802.11a/b/g/n/ac, etc. The terms 'BS,' 'gNB,' and 'TRP' can be used interchangeably in this disclosure to refer to network infrastructure components that provide wireless access to remote terminals. Also, depending on the network type, the term 'user equipment' (UE) can refer to any component such as mobile station, subscriber station, remote terminal, wireless terminal, receive point, vehicle, or user device. For example, a UE could be a mobile telephone, a smartphone, a monitoring device, an alarm device, a fleet management device, an asset tracking device, an automobile, a desktop computer, an entertainment device, an infotainment device, a vending machine, an electricity meter, a water meter, a gas meter, a security device, a sensor device, an appliance, and the like. A UE can also refer to remote wireless equipment that wirelessly accesses an gNB, whether the UE is a mobile device (such as a mobile telephone or smartphone) or is normally considered a stationary device (such as a desktop computer or vending machine). The UE may also be a car, a truck, a van, a drone, or any similar machine or a device in such machines.

Figure 2:
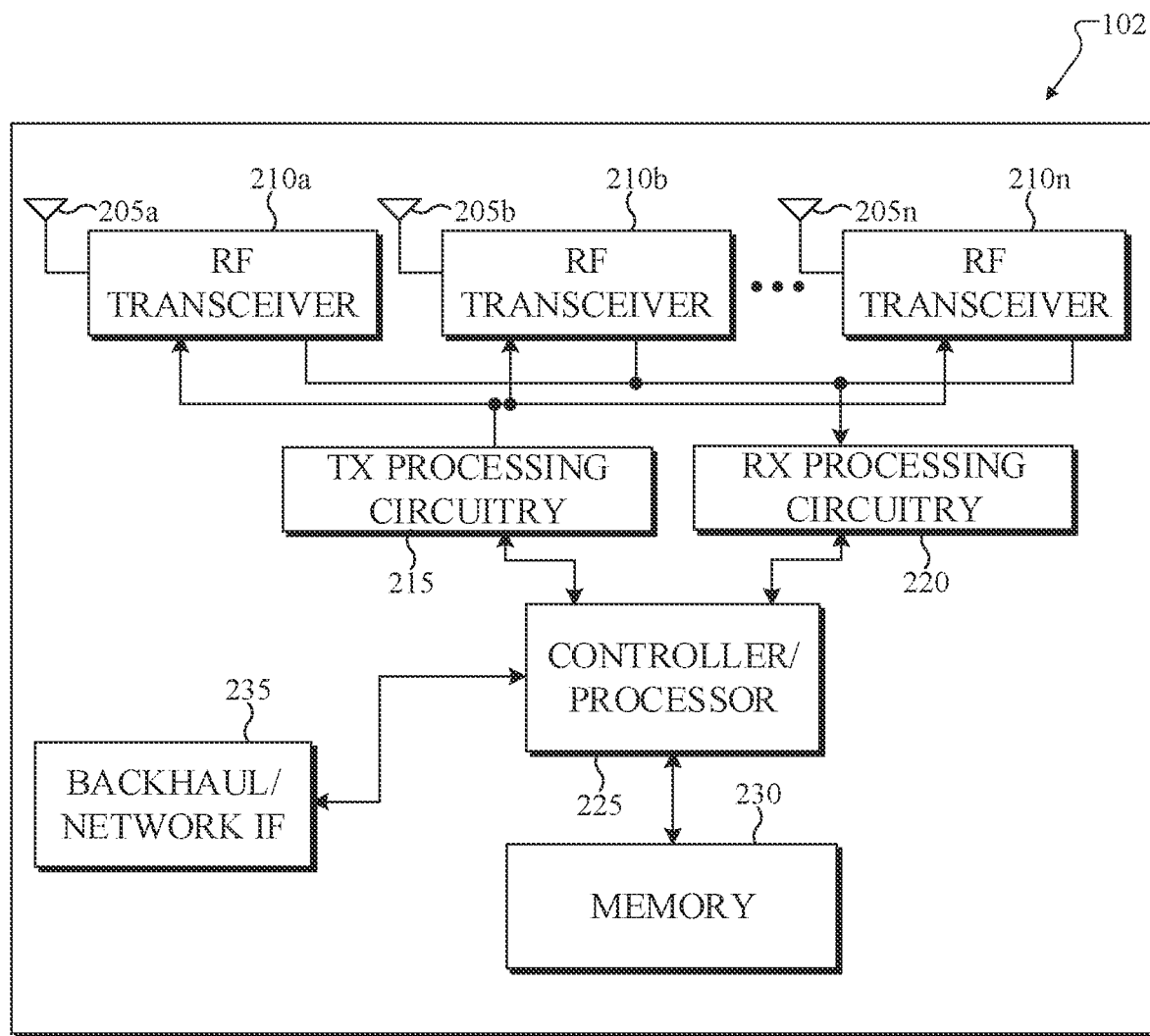
FIG. 2 illustrates an example base station (BS) according to embodiments of the present disclosure.
Figure 3:
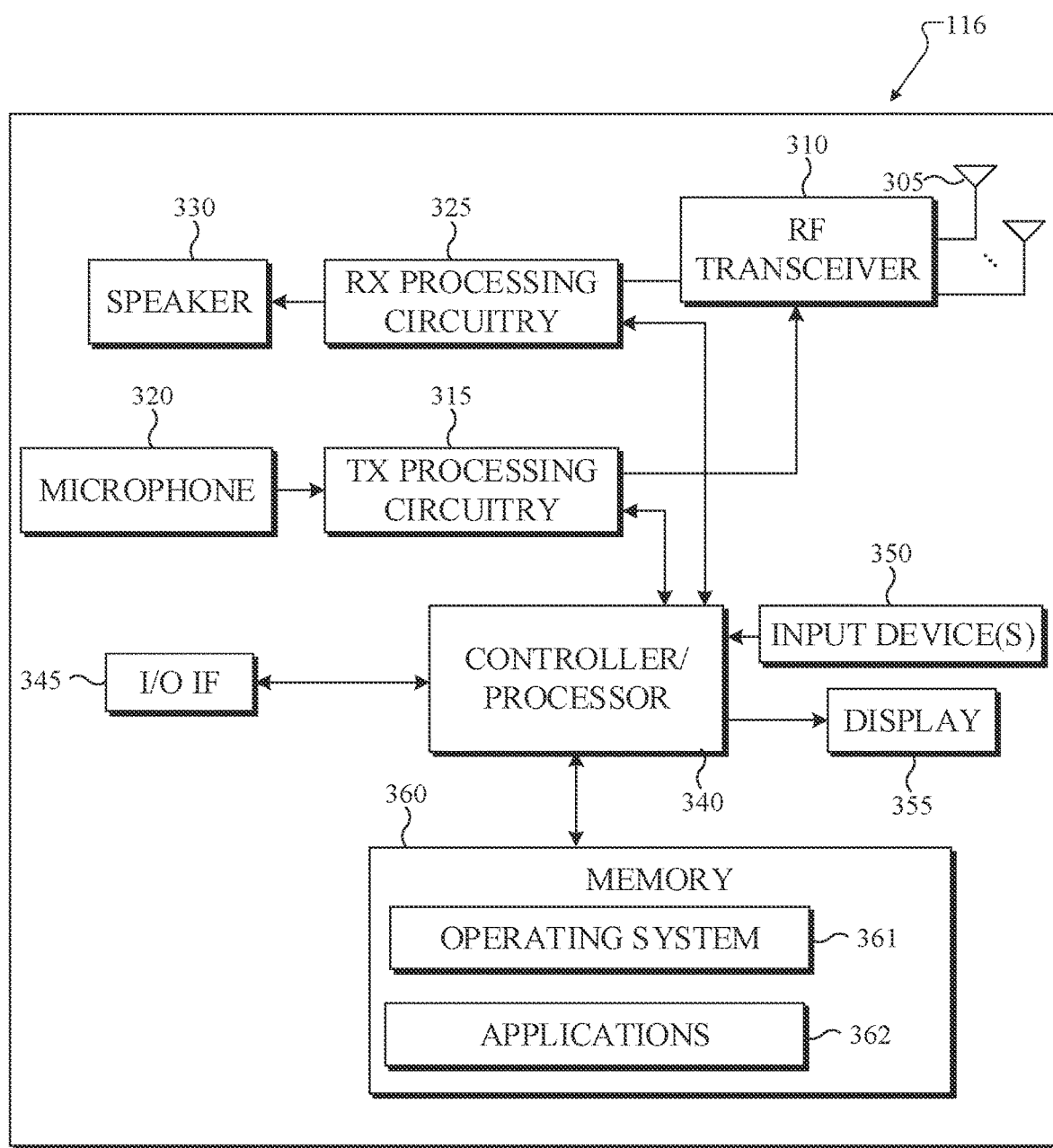
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a base station, BS 101 (e.g., gNB), a BS 102, and a BS 103. The BS 101 communicates with the BS 102 and the BS 103. The BS 101 also communicates with at least one network 130, such as the Internet, a proprietary Internet Protocol (IP) network, or other data network.

The BS 102 provides wireless broadband access to the network 130 for a first plurality of user equipment's (UEs) within a coverage area 120 of the BS 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The BS 103 provides wireless broadband access to the network 130 for a second plurality of UEs within a coverage area 125 of the BS 103. The second plurality of UEs includes the UE 115 and the UE 116. In some embodiments, one or more of the BSs 101-103 may communicate with each other and with the UEs 111-116 using 5G/NR, long term evolution (LTE), long term evolution-advanced (LTE-A), WiMAX, WiFi, or other wireless communication techniques.

Dotted lines show the approximate extents of the coverage areas 120 and 125, which are shown as approximately circular for the purposes of illustration and explanation only. It should be clearly understood that the coverage areas associated with BSs, such as the coverage areas 120 and 125, may have other shapes, including irregular shapes, depending upon the configuration of the BSs and variations in the radio environment associated with natural and man-made obstructions.

As described in more detail below, one or more of the UEs 111-116 include circuitry, programing, or a combination thereof for acknowledgement reporting for reception of control information. In certain embodiments, and one or more of the BSs 101-103 includes circuitry, programing, or a combination thereof for receiving acknowledgement reporting for reception of control information.

Although FIG. 1 illustrates one example of a wireless network, various changes may be made to FIG. 1. For example, the wireless network could include any number of BSs and any number of UEs in any suitable arrangement. Also, the BS 101 could communicate directly with any number of UEs and provide those UEs with wireless broadband access to the network 130. Similarly, each BS 102-103 could communicate directly with the network 130 and provide UEs with direct wireless broadband access to the network 130. Further, the BSs 101, 102, and/or 103 could provide access to other or additional external networks, such as external telephone networks or other types of data networks.

FIG. 2 illustrates an example BS 102 according to embodiments of the present disclosure. The embodiment of the BS 102 illustrated in FIG. 2 is for illustration only, and the BSs 101 and 103 of FIG. 1 could have the same or similar configuration. However, BSs come in a wide variety of configurations, and FIG. 2 does not limit the scope of this disclosure to any particular implementation of a BS.

As shown in FIG. 2, the BS 102 includes multiple antennas 205a-205n, multiple radio frequency (RF) transceivers 210a-210n, transmit (TX) processing circuitry 215, and receive (RX) processing circuitry 220. The BS 102 also includes a controller/processor 225, a memory 230, and a backhaul or network interface 235.

The RF transceivers 210a-210n receive, from the antennas 205a-205n, incoming RF signals, such as signals transmitted by UEs in the wireless network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the BS 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support acknowledgement reporting for reception of control information. Any of a wide variety of other functions could be supported in the BS 102 by the controller/processor 225. In some embodiments, the controller/processor 225 includes at least one microprocessor or microcontroller.

The controller/processor 225 is also capable of executing programs and other processes resident in the memory 230, such as an OS. The controller/processor 225 can move data into or out of the memory 230 as required by an executing process. In certain embodiments, the controller/processor 225 supports reception of acknowledgement reporting for reception of control information. For example, the controller/processor 225 can move data into or out of the memory 230 according to a process that is being executed.

The controller/processor 225 is also coupled to the backhaul or network interface 235. The backhaul or network interface 235 allows the BS 102 to communicate with other devices or systems over a backhaul connection or over a network. The network interface 235 could support communications over any suitable wired or wireless connection(s). For example, when the BS 102 is implemented as part of a cellular communication system (such as one supporting 5G/NR, LTE, or LTE-A), the network interface 235 could allow the BS 102 to communicate with other BSs over a wired or wireless backhaul connection. When the BS 102 is implemented as an access point, the network interface 235 could allow the BS 102 to communicate over a wired or wireless local area network or over a wired or wireless connection to a larger network (such as the Internet). The network interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of BS 102, various changes may be made to FIG. 2. For example, the BS 102 could include any number of each component shown in FIG. 2. As a particular example, an access point could include a number of network interfaces 235, and the controller/processor 225 could support routing functions to route data between different network addresses. As another particular example, while shown as including a single instance of TX processing circuitry 215 and a single instance of RX processing circuitry 220, the BS 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a RF transceiver 310, TX processing circuitry 315, a microphone 320, and receive (RX) processing circuitry 325. The UE 116 also includes a speaker 330, a processor 340, an input/output (I/O) interface (IF) 345, an input device 350, a display 355, and a memory 360. The memory 360 includes an operating system (OS) 361 and one or more applications 362.

The RF transceiver 310 receives, from the antenna 305, an incoming RF signal transmitted by a BS of the wireless network 100. The RF transceiver 310 down-converts the incoming RF signal to generate an intermediate frequency (IF) or baseband signal. The IF or baseband signal is sent to the RX processing circuitry 325 that generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from BSs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input device 350. The operator of the UE 116 can use the input device 350 to enter data into the UE 116. The input device 350 can be a keyboard, touchscreen, mouse, track ball, voice input, or other device capable of acting as a user interface to allow a user in interact with the UE 116. For example, the input device 350 can include voice recognition processing, thereby allowing a user to input a voice command. In another example, the input device 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme.

The processor 340 is also coupled to the display 355. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

FIG. 4 and FIG. 5 illustrate example wireless transmit and receive paths according to this disclosure. In the following description, a transmit path 400, of FIG. 4, may be described as being implemented in a BS (such as the BS 102), while a receive path 500, of FIG. 5, may be described as being implemented in a UE (such as a UE 116). However, it may be understood that the receive path 500 can be implemented in a BS and that the transmit path 400 can be implemented in a UE. In some embodiments, the receive path 500 is configured to support acknowledgement reporting for reception of control information as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the BS 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the BS 102 arrives at the UE 116 after passing through the wireless channel, and reverse operations to those at the BS 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the BSs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the BSs 101-103 and may implement the receive path 500 for receiving in the downlink from the BSs 101-103. Furthermore, each of the UE's 111-116 may implement a receive path 250 for receiving in the sidelink from another one of the UE's 111-116.

Each of the components in FIG. 4 and FIG. 5 can be implemented using hardware or using a combination of hardware and software/firmware. As a particular example, at least some of the components in FIGS. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

A unit for downlink (DL) signaling or for uplink (UL) signaling on a cell is referred to as a slot and can include one or more symbols. A bandwidth (BW) unit is referred to as a resource block (RB). One RB includes a number of sub-carriers (SCs). For example, a slot can have duration of one millisecond and an RB can have a bandwidth of 180 kHz and include 12 SCs with inter-SC spacing of 15 kHz. A sub-carrier spacing (SCS) can be determined by a SCS configuration $\mu$ as $2^{\mu} \cdot 15$ kHz. A unit of one sub-carrier over one symbol is referred to as a resource element (RE). A unit of one RB over one symbol is referred to as a physical RB (PRB).

DL signals include data signals conveying information content, control signals conveying DL control information (DCI), reference signals (RS), and the like that are also known as pilot signals. A BS (such as the BS 102) transmits data information or DCI through respective physical DL shared channels (PDSCHs) or physical DL control channels (PDCCHs). A PDSCH or a PDCCH can be transmitted over a variable number of slot symbols including one slot symbol. A BS transmits one or more of multiple types of RS including channel state information RS (CSI-RS) and demodulation RS (DM-RS). A CSI-RS is intended for UEs (such as the UE 116) to perform measurements and provide channel state information (CSI) to a BS. For channel measurement or for time tracking, non-zero power CSI-RS (NZP CSI-RS) resources can be used. For interference measurement reports (IMRs), CSI interference measurement (CSI-IM) resources can be used. The CSI-IM resources can also be associated with a zero power CSI-RS (ZP CSI-RS) configuration. A UE can determine CSI-RS reception parameters through DL control signaling or higher layer signaling, such as radio resource control (RRC) signaling from a gNB. A DM-RS is typically transmitted within a BW of a respective PDCCH or PDSCH and a UE can use the DM-RS to demodulate data or control information.

UL signals also include data signals conveying information content, control signals conveying UL control information (UCI), DM-RS associated with data or UCI demodulation, sounding RS (SRS) enabling a gNB to perform UL channel measurement, and a random access (RA) preamble enabling a UE (such as the UE 116) to perform random access. A UE transmits data information or UCI through a respective physical UL shared channel (PUSCH) or a physical UL control channel (PUCCH). A PUSCH or a PUCCH can be transmitted over a variable number of slot symbols including one slot symbol. When a UE simultaneously transmits data information and UCI, the UE can multiplex both in a PUSCH or, depending on a UE capability, transmit both a PUSCH with data information and a PUCCH with UCI at least when the transmissions are on different cells.

UCI includes hybrid automatic repeat request (HARQ) acknowledgement (ACK) information, indicating correct or incorrect detection of data transport blocks (TBs) or of code block groups (CBGs) in a PDSCH, scheduling request (SR) indicating whether a UE has data in its buffer to transmit, and CSI reports enabling a gNB to select appropriate parameters for PDSCH or PDCCH transmissions to a UE. A CSI report can include a channel quality indicator (CQI) informing a gNB of a largest modulation and coding scheme (MCS) for the UE to detect a data TB with a predetermined block error rate (BLER), such as a 10% BLER, of a precoding matrix indicator (PMI) informing a gNB how to combine signals from multiple transmitter antennas in accordance with a multiple input multiple output (MIMO) transmission principle, of a CSI-RS resource indicator (CRI) used to obtain the CSI report, and of a rank indicator (RI) indicating a transmission rank for a PDSCH. In certain embodiments, UL RS includes DM-RS and SRS. DM-RS is typically transmitted within a BW of a respective PUSCH or PUCCH. A gNB can use a DM-RS to demodulate information in a respective PUSCH or PUCCH. SRS is transmitted by a UE to provide a gNB with an UL CSI and, for a time division duplexing (TDD) system, to also provide a PMI for DL transmission. Further, as part of a random access procedure or for other purposes, a UE can transmit a physical random access channel (PRACH).

DL transmissions and UL transmissions can be based on an orthogonal frequency division multiplexing (OFDM) waveform including a variant using DFT precoding that is known as DFT-spread-OFDM.

Figure 6:
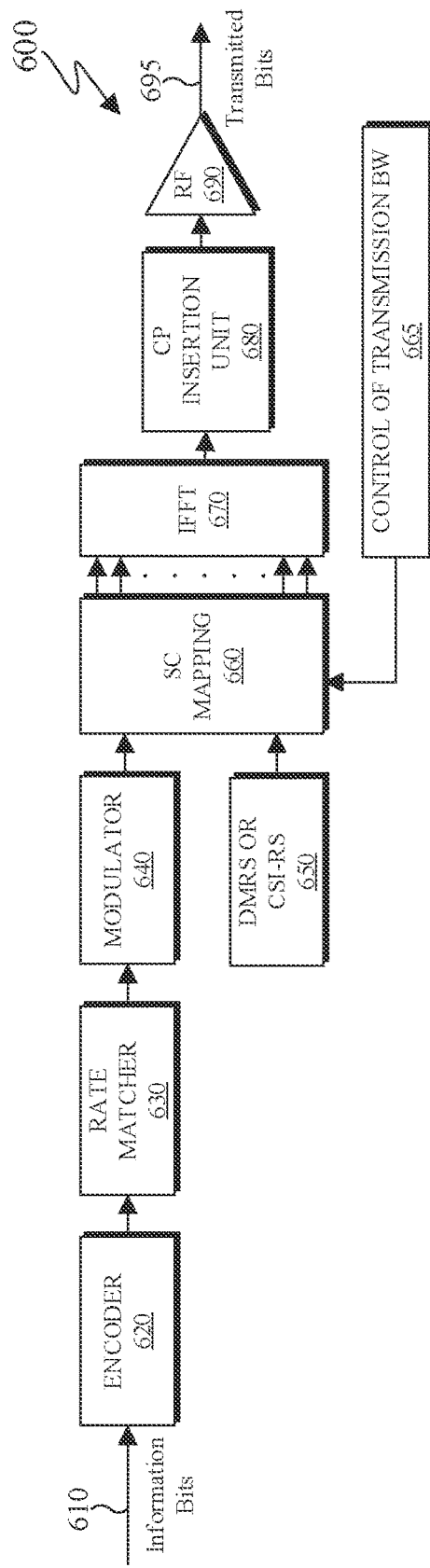
FIG. 6 illustrates a block diagram of an example transmitter structure using orthogonal frequency division multiplexing (OFDM) according to embodiments of the present disclosure.
Figure 7:
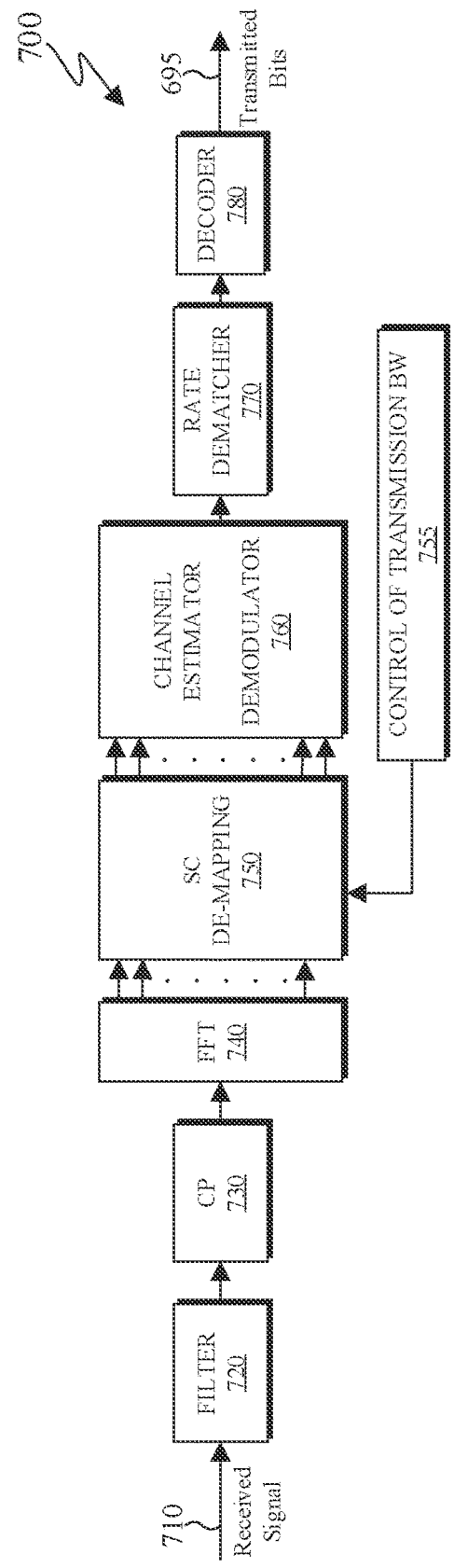
FIG. 7 illustrates a block diagram of an example receiver structure using OFDM according to embodiments of the present disclosure.

FIG. 6 illustrates a block diagram 600 of an example transmitter structure using orthogonal frequency division multiplexing (OFDM) according to embodiments of the present disclosure. FIG. 7 illustrates a block diagram 700 of an example receiver structure using OFDM according to embodiments of the present disclosure.

The transmitter structure as shown in the block diagram 600 and the receiver structure as shown in the block diagram 600 can be similar to the RF transceivers 210a-210n of FIG. 2 and the RF transceiver 310 of FIG. 3. The example block diagram 600 of FIG. 6 and the block diagram 700 of FIG. 7 are for illustration only and other embodiments can be used without departing from the scope of the present disclosure.

As illustrated in the block diagram 600, information bits 610, such as DCI bits or data bits, are encoded by encoder 620, rate matched to assigned time/frequency resources by rate matcher 630 and modulated by modulator 640. Subsequently, modulated encoded symbols and demodulation reference signal (DMRS) or CSI-RS 650 are mapped to SCs by SC mapping unit 660 with input from BW selector unit 665, an inverse fast Fourier transform (IFFT) is performed by filter 670, a cyclic prefix (CP) is added by CP insertion unit 680, and a resulting signal is filtered by filter 690 and transmitted by a radio frequency (RF) unit as transmitted bits 695.

As illustrated in the block diagram 700, a received signal 710 is filtered by filter 720, a CP removal unit 730 removes a CP, a filter 740 applies a fast Fourier transform (FFT), SCs de-mapping unit 750 de-maps SCs selected by BW selector unit 755, received symbols are demodulated by a channel estimator and a demodulator unit 760, a rate de-matcher 770 restores a rate matching, and a decoder 780 decodes the resulting bits to provide information bits 790.

In certain embodiments, a UE monitors multiple candidate locations for respective potential PDCCH receptions to decode multiple DCI formats in a slot. A DCI format includes cyclic redundancy check (CRC) bits in order for the UE to confirm a correct detection of the DCI format. A type of a DCI format is identified by a radio network temporary identifier (RNTI) that scrambles the CRC bits.

For a DCI format scheduling a PDSCH or a PUSCH to a single UE, the RNTI can be a cell RNTI (C-RNTI), or a configured scheduling RNTI (CS-RNTI), or an MCS-C-RNTI and serves as a UE identifier. In the following examples, the C-RNTI will be referred to when needed. A UE typically receives/monitors PDCCH for detections of DCI formats with CRC scrambled by a C-RNTI according to a UE-specific search space (USS).

For a DCI format scheduling a PDSCH conveying system information (SI), the RNTI can be an SI-RNTI. For a DCI format scheduling a PDSCH providing a random access response (RAR), the RNTI can be an RA-RNTI. For a DCI format scheduling a PDSCH providing paging information, the RNTI can be a P-RNTI. There are also a number of other RNTIs associated with DCI formats providing various control information and are monitored according to a common search space (CSS).

Figure 8:
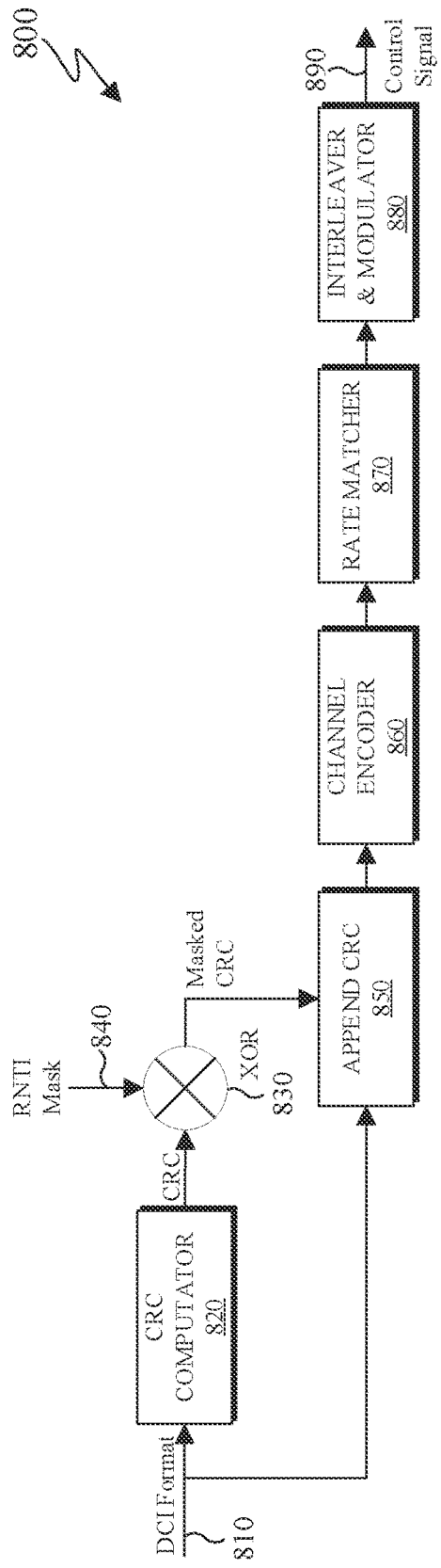
FIG. 8 illustrates an example encoding process for a downlink control information (DCI) format according to embodiments of the present disclosure.
Figure 9:
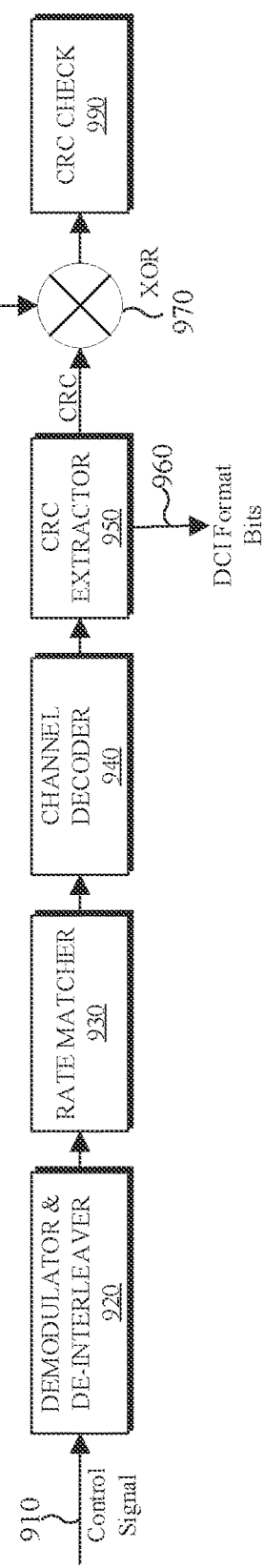
FIG. 9 illustrates an example decoding process for a DCI format for use with a UE according to embodiments of the present disclosure.

FIG. 8 illustrates an example encoding process 800 for a downlink control information (DCI) format according to embodiments of the present disclosure. FIG. 9 illustrates an example decoding process 900 for a DCI format for use with a UE according to embodiments of the present disclosure. The encoding process 800 of FIG. 8 and the decoding process 900 of FIG. 9 are for illustration only and other embodiments can be used without departing from the scope of the present disclosure.

A BS separately encodes and transmits each DCI format in a respective PDCCH. When applicable, a RNTI for a UE that a DCI format is intended for masks a CRC of the DCI format codeword in order to enable the UE to identify the DCI format. For example, the CRC can include 16 bits or 24 bits and the RNTI can include 16 bits or 24 bits. Otherwise, when a RNTI is not included in a DCI format, a DCI format type indicator field can be included in the DCI format.

As illustrated in FIG. 8, the CRC of (non-coded) DCI format bits 810 is determined using a CRC computation unit 820, and the CRC is masked using an exclusive OR (XOR) operation unit 830 between CRC bits and RNTI bits 840. The XOR operation is defined as XOR(0,0)=0, XOR(0,1)=1, XOR(1,0)=1, XOR(1,1)=0. The masked CRC bits are appended to DCI format information bits using a CRC append unit 850. An encoder 860 performs channel coding (such as tail-biting convolutional coding or polar coding), followed by rate matching to allocated resources by rate matcher 870. Interleaving and modulation units 880 apply interleaving and modulation, such as QPSK, and the output control signal 890 is transmitted.

As illustrated in FIG. 9, a received control signal 910 is demodulated and de-interleaved by a demodulator and a de-interleaver 920. A rate matching applied at a BS transmitter is restored by rate matcher 930, and resulting bits are decoded by decoder 940. After decoding, a CRC extractor 950 extracts CRC bits and provides DCI format information bits 960. The DCI format information bits are de-masked 970 by an XOR operation with a RNTI 980 (when applicable) and a CRC check is performed by unit 990. When the CRC check succeeds (check-sum is zero), the decoding is correct, the DCI format is detected, and DCI format information bits are considered to be valid. When the CRC check does not succeed, the decoding is not correct, the DCI format is not detected, and DCI format information bits are considered to be invalid.

In certain embodiments, a PDCCH transmission can be within a set of PRBs. A BS can configure a UE with one or more sets of PRB sets, also referred to as control resource sets (CORESETs), for PDCCH receptions. A PDCCH reception can be in control channel elements (CCEs) that are included in a CORESET.

A UE can monitor PDCCH according to a first PDCCH monitoring type or according to a second PDCCH monitoring type. For the first PDCCH monitoring type that corresponds to a UE capability for PDCCH monitoring per slot, a maximum number of PDCCH candidates $M_{PDCCH}^{max,slot,\mu}$ and a maximum number of non-overlapping CCEs $C_{PDCCH}^{max,slot,\mu}$ for the reception of PDCCH candidates is defined per slot. Non-overlapping CCEs are CCEs with different indexes or in different symbols of a CORESET or in different CORESETs.

In certain embodiments, a UE determines CCEs for decoding a PDCCH candidate based on a search space. For some RNTIs, such as a C-RNTI, a set of PDCCH candidates for respective DCI formats define corresponding UE-specific search space (USS) sets. For other RNTIs, such as a SI-RNTI, a set of PDCCH candidates for respective DCI formats define corresponding common search space sets (CSS sets). A search space set is associated with a CORESET where the UE monitors PDCCH candidates for the search space set. A UE expects to monitor PDCCH candidates for up to 4 sizes of DCI formats that include up to 3 sizes of DCI formats with CRC scrambled by C-RNTI per serving cell. The UE can count a number of sizes for DCI formats per serving cell based on a number of configured PDCCH candidates in respective search space sets for the corresponding active DL bandwidth part (BWP).

For a search space set s associated with CORESET p, the CCE indexes for aggregation level L corresponding to PDCCH candidate $m_{s,n_{CI}}$ of the search space set in slot $n_{s,f}^\mu$ for an active DL BWP of a serving cell corresponding to carrier indicator field value $n_{CI}$ are given by Equation (1), below. As described in Equation (1), for any CSS, $Y_{p,n_{s,f}^\mu}=0$. Similar, for a USS, $Y_{p,n_{s,f}^\mu}=(A_p \cdot Y_{p,n_{s,f}^\mu}-1)$ modD, $Y_{p,-1}=n_{RNTI} \neq 0$, $A_p=39827$ for pmod 3=0, $A_p=39829$ for pmod 3=1, $A_p=39839$ for pmod 3=2, and D=65537. Additionally, as described in Equation (1), i=0, . . . , L−1, and $N_{CCE,p}$ is a number of CCEs, numbered from 0 to $N_{CCE,p}-1$, in CORESET p. Similar, $n_{CI}$ is a carrier indicator field value if the UE is configured with a carrier indicator field for the serving cell on which PDCCH is monitored; otherwise, including for any CSS, $n_{CI}=0$. The expression $m_{s,n_{CI}}$ as described in Equation (1), illustrates that $m_{s,n_{CI}}=0, \ldots, M_{s,n_{CI}}^{(L)}-1$, where $M_{s,n_{CI}}^{(L)}$ is the number of PDCCH candidates the UE is configured to monitor for aggregation level L of a search space set s for a serving cell corresponding to $n_{CI}$. For a USS, $M_{s,max}^{(L)}$ is the maximum of $M_{s,n_{CI}}^{(L)}$ over all configured $n_{CI}$ values for a CCE aggregation level L of search space set s. Further, the RNTI value used for $n_{RNTI}$ is the C-RNTI.

$$L \cdot \left\{ \left( Y_{p,n_{s,f}^\mu} + \left\lfloor \frac{m_{s,n_{CI}} \cdot N_{CCE,p}}{L \cdot M_{s,max}^{(L)}} \right\rfloor + n_{CI} \right) \bmod \lfloor N_{CCE,p}/L \rfloor \right\} + i \quad (1)$$

In certain embodiments, a UE (such as the UE 116) monitors PDCCH according to a CSS for scheduling a PDSCH providing system information, random access response, or paging only on one cell that is referred to as primary cell. The UE transmits PUCCH only on the primary cell. In certain embodiments, the UE is configured as a primary secondary cell (PSCell) for PUCCH transmissions. When the UE is configured as a PSCell, the UE transmits PUCCH on the primary cell for a master/primary cell group and transmits PUCCH on the PSCell for a secondary cell group. For brevity, the embodiments descriptions of this disclosure considers the primary cell, but the embodiments can be directly extended to a PSCell.

In certain embodiments, a UE (such as the UE 116) is configured to monitor PDCCH for DCI formats providing information that determines subsequent scheduling attributes for the UE. For example, DCI format 2_0 provides a structure of a slot, in terms of symbols that are DL, UL, or reserved, over a number of slots. In this example, the UE is expected to use information to determine whether to transmit channel or signals that are configured by higher layers such as a configured grant PUSCH (CG-PUSCH), a PUCCH with periodic or semi-persistent CSI (P/SP-CSI) report or with SR, a periodic or semi-persistent SRS (P/SP-SRS), or a PRACH. Also, a DCI format 2_0 can provide information for a set of search space sets, from a number of configured sets of search space sets, for a UE to use over a number of slots until a next reception of a PDCCH with DCI format 2_0. For operation with shared spectrum, DCI format 2_0 can also include information for a channel occupancy time (COT) duration. In general, DCI format 2_0 can be used by a gNB to adapt several components associated with receptions or transmissions by a UE.

A UE (such as the UE 116) that is configured with discontinuous reception (DRX) mode operation, can also be configured to monitor PDCCH for detection of a DCI format, referred to as DCI format 2_6 that provides information for whether or not the UE is expected to start a drx-onDurationTimer for the next DRX cycle. The drx-onDurationTimer is the duration at the beginning of a DRX cycle. DCI format 2_6 can also include a bitmap for corresponding groups of configured SCells for the UE where a bit of the bitmap indicates whether an active DL BWP is a dormant BWP or an active (non-dormant) DL BWP for the UE for each activated SCell in the corresponding group of configured SCells, if a current active DL BWP is the dormant DL BWP, or a current active DL BWP for the UE for each activated SCell in the corresponding group of configured SCells if the current active DL BWP is not the dormant DL BWP. The UE may not monitor PDCCH in the dormant BWP of an SCell.

In certain embodiments, a UE (such as the UE 116) is configured to monitor a DCI format 2_4 indicating time-frequency resources where UEs need to cancel transmissions, such as PUSCH or SRS transmissions.

As described in 3GPP TS 38.213 v16.2.0, "NR; Physical Layer Procedures for Control", a UE does not expect to be configured CSS sets that result to corresponding total, or per scheduled cell, numbers of monitored PDCCH candidates and non-overlapped CCEs per slot that exceed the corresponding maximum numbers per slot. For same cell scheduling or for cross-carrier scheduling where a scheduling cell and scheduled cell(s) have DL BWPs with same SCS configuration $\mu$, a UE does not expect a number of PDCCH candidates and a number of corresponding non-overlapped CCEs per slot on a secondary cell to be larger than the corresponding numbers that the UE is capable of monitoring on the secondary cell per slot. For cross-carrier scheduling, the number of PDCCH candidates for monitoring and the number of non-overlapped CCEs per slot are separately counted for each scheduled cell.

For all search space sets within a slot n, denote by $S_{css}$ a set of CSS sets with cardinality of $I_{css}$ and by $S_{uss}$ a set of USS sets with cardinality of $I_{uss}$. The location of USS sets $s_j$, $0 \leq j < J_{uss}$, in $S_{uss}$ is according to an ascending order of the search space set index. Denote by $M_{S_{css}(i)}^{(L)}$, $0 \leq i < I_{css}$, the number of counted PDCCH candidates for monitoring for CSS set $S_{css}(i)$ and by $M_{S_{uss}(j)}^{(L)}$, $0 \leq j < J_{uss}$, the number of counted PDCCH candidates for monitoring for USS set $S_{uss}(j)$.

For the CSS sets, a UE monitors $M_{PDCCH}^{CSS} = \Sigma_{i=0}^{I_{css}-1} \Sigma_L M_{S_{css}(i)}^{(L)}$ PDCCH candidates requiring a total of $C_{PDCCH}^{CSS}$ non-overlapping CCEs in a slot.

The UE allocates PDCCH candidates for monitoring to USS sets for the primary cell having an active DL BWP with SCS configuration $\mu$ in slot n according to the following pseudocode as shown in TABLE 1 and as described in 3GPP TS 38.213 v16.2.0, "NR; Physical Layer Procedures for Control". Denote by $V_{CCE}(S_{uss}(j))$ the set of non-overlapping CCEs for search space set $S_{uss}(j)$ and by $C(V_{CCE}(S_{uss}(j)))$ the cardinality of $V_{CCE}(S_{uss}(j))$ where the non-overlapping CCEs for search space set $S_{uss}(j)$ are determined considering the allocated PDCCH candidates for monitoring for the CSS sets and the allocated PDCCH candidates for monitoring for all search space sets $S_{uss}(k)$, $0 \leq k \leq j$.

TABLE 1

Pseudocode

Set $M_{PDCCH}^{uss} = \min(M_{PDCCH}^{max,slot,\mu}, M_{PDCCH}^{total,slot,\mu}) - M_{PDCCH}^{css}$
Set $C_{PDCCH}^{uss} = \min(C_{PDCCH}^{max,slot,\mu}, C_{PDCCH}^{total,slot,\mu}) - C_{PDCCH}^{css}$
Set j = 0
while $\Sigma_L M_{S_{uss}(j)}^{(L)} \leq M_{PDCCH}^{uss}$ AND $C(V_{CCE}(S_{uss}(j))) \leq C_{PDCCH}^{uss}$
 allocate $\Sigma_L M_{S_{uss}(j)}^{(L)}$ PDCCH candidates for monitoring to USS set $S_{uss}(j)$
 $M_{PDCCH}^{uss} = M_{PDCCH}^{uss} - \Sigma_L M_{S_{uss}(j)}^{(L)}$;
 $C_{PDCCH}^{uss} = C_{PDCCH}^{uss} - C(V_{CCE}(S_{uss}(j)))$;
 j = j + 1;
end while Similar to DCI formats providing information to a UE for parameters associated with receptions or transmissions by the UE, a UE (such as the UE 116) can be configured to monitor PDCCH for detection of a DCI format scheduling a broadcast or a groupcast PDSCH transmission. Such a DCI format may also not include a PUCCH resource for each UE from the group of UEs or may not include a downlink assignment index (DAI), and so on. Additionally, there may not be another DCI format for the UE to detect before the UE needs to provide an acknowledgement information report regarding a detection of the DCI format.

When a UE does not detect a DCI format providing information for parameters associated with receptions or transmissions by the UE, it may be beneficial for the UE to inform a serving gNB so that the UE and the gNB have a same understanding. Such information can be considered as acknowledgement information for the detection or absence of detection of the DCI format.

A UE may need to report HARQ-ACK information in response to correct or incorrect detection of a DCI format (first HARQ-ACK information type) together with HARQ-ACK information in response to correct of incorrect detection of transport blocks (second HARQ-ACK information type). The HARQ-ACK information report can be based on one of several codebook types such as a Type-1 HARQ-ACK codebook or a Type-2 HARQ-ACK codebook. A PUCCH resource determination and a determination of an HARQ-ACK codebook can be different for the two HARQ-ACK information types. This is because a DCI format providing information for a group of UEs or scheduling a PDSCH reception by a group of UEs may not include a field indicating a PUCCH resource for each UE from the group of UEs or may not include a downlink assignment index (DAI), and so on. Also, when a UE does not detect a DCI format, there may not be another DCI format for the UE to detect before the UE needs to provide HARQ-ACK information regarding a detection of the DCI format.

In certain embodiments, a UE determines a PUCCH transmission power $P_{PUCCH,b,f,c}$ on an active UL BWP b of carrier f in a cell c using PUCCH power control adjustment state with index l as described in Equation (2).

$$P_{PUCCH,b,f,c} = \min\left\{\begin{array}{c} P_{CMAX,f,c} \\ P_{O\_PUCCH,b,f,c} + 10\log_{10}(2^\mu \cdot M_{RB,b,f,c}^{PUCCH}) + \\ PL_{b,f,c} + \Delta_{F\_PUCCH} + \Delta_{TF,b,f,c} + g_{b,f,c} \end{array}\right\} \text{[dBm]} \quad (2)$$

Here, $P_{CMAX,f,c}$ is a maximum transmission power, $P_{O\_PUCCH,b,f,c}$ is a nominal received power, $\mu$ is a sub-carrier spacing (SCS) configuration with $\mu=0$ corresponding to 15 kHz, $M_{RB,b,f,c}^{PUCCH}$ is a number of RBs for the PUCCH transmission, $PL_{b,f,c}$ is a measured path-loss, $\Delta_{F\_PUCCH}$ depends on several parameters for the PUCCH transmission including a PUCCH format, $\Delta_{TF,b,f,c}$ provides an adjustment according to a spectral efficiency, and $g_{b,f,c}$ is a closed-loop power control state based on transmit power control (TPC) command values the UE receives in DCI formats.

A UE can also multiplex HARQ-ACK information in a PUSCH transmission. Then, a UE determines a number of coded modulation symbols for the HARQ-ACK information based on a number of HARQ-ACK information bits, a spectral efficiency of the PUSCH transmission, and a scaling factor $\beta_{offset}^{HARQ-ACK}$. Further, the UE can reserve a number of REs in the PUSCH transmission for multiplexing a number of HARQ-ACK information bits, such as two bits, in order to avoid error events where a serving gNB expects HARQ-ACK information to be multiplexed in the PUSCH transmission but the UE fails to detect a DCI format associated with the HARQ-ACK information.

When a PDSCH reception is by a single UE it can be referred to as unicast PDSCH reception. When a PDSCH reception is by a group of UEs, it can be referred to as groupcast or multicast PDSCH reception. In certain embodiments, a UE can be configured to receive both unicast PDSCH and groupcast PDSCH. A procedure for the UE to monitor PDCCH for detection of a DCI format scheduling groupcast PDSCH reception, separately from or in conjunction with monitoring PDCCH for detection of DCI formats scheduling unicast PDSCH reception or PUSCH transmission, needs to be defined while considering limitation in a UE capability for PDCCH monitoring. Further, reporting of HARQ-ACK information for groupcast PDSCH receptions, separately from or in conjunction with reporting HARQ-ACK information for unicast PDSCH receptions, needs to be also defined.

Accordingly, embodiments of the present disclosure take into consideration that there is a need to define a procedure for a UE to report acknowledgement information in response to a correct on incorrect detection of a DCI format.

Embodiments of the present disclosure also take into consideration that there is another need to define a procedure for multiplexing HARQ-ACK information in response to a correct of incorrect detection of DCI formats and HARQ-ACK information in response to a correct of incorrect detection of transport blocks.

Embodiments of the present disclosure further take into consideration that there is another need to define a procedure for a UE to multiplex HARQ-ACK information in response to PDSCH receptions of different types in general and in response to unicast PDSCH receptions and to groupcast PDSCH receptions in particular.

Additionally, embodiments of the present disclosure take into consideration that there is a need to define a UE procedure to monitor PDCCH for detection of DCI formats providing common control information, of DCI formats scheduling groupcast PDSCH receptions, and of DCI formats scheduling unicast PDSCH receptions or PUSCH transmissions.

Accordingly, embodiments of the present disclosure relate to defining a procedure for a UE to report acknowledgement information in response to a correct on incorrect detection of a DCI format. This disclosure also relates to defining a procedure for multiplexing HARQ-ACK information in response to a correct of incorrect detection of DCI formats and HARQ-ACK information in response to a correct of incorrect detection of transport blocks. This disclosure further relates to defining a procedure for a UE to multiplex HARQ-ACK information in response to PDSCH receptions of different types in general and in response to unicast PDSCH receptions and to groupcast PDSCH receptions in particular. Additionally, this disclosure relates to define a UE procedure to monitor PDCCH for detection of DCI formats providing common control information, of DCI formats scheduling groupcast PDSCH receptions, and of DCI formats scheduling unicast PDSCH receptions or PUSCH transmissions.

As used below, the term "DCI format A" is used to refer to a DCI format with CRC that is not scrambled by a RNTI associated with scheduling a PDSCH reception. "DCI format B" is used to refer to a DCI format with CRC that is scrambled by a RNTI associated with scheduling a groupcast PDSCH reception. It is noted that a DCI format B can have a same size as a DCI format used for scheduling unicast PDSCH reception, and has a separately configured RNTI referred to as G-RNTI or includes a flag to identify scheduling of groupcast PDSCH reception. A groupcast PDSCH reception is referred to as G-PDSCH while a unicast PDSCH reception is referred to as U-PDSCH.

Also, as used below, reference to HARQ-ACK information associated with DCI formats scheduling unicast PDSCH receptions is used with respect to unicast PDSCH receptions but can also be for reception of a semi-persistent scheduling (SPS) PDSCH release or for a DCI format with CRC scrambled by a RNTI associated with scheduling a PDSCH reception that instead indicates dormant/non-dormant active DL BWPs for the UE in a group of cells without scheduling a PDSCH reception.

Additionally, the term "higher layers" is used to denote control information that a UE is provided in a PDSCH reception, such as RRC or a medium access control (MAC) control element (CE).

Embodiments of the present disclosure describe HARQ-ACK information for a detection of a DCI format A. The following embodiments and examples, such as those described in FIGS. 10 and 11, describe HARQ-ACK information for a detection of a DCI format A.

An embodiment of the disclosure describes a procedure for a UE to report acknowledgement information in response to a correct on incorrect detection of a DCI format A. In certain scenarios a UE monitors PDCCH for detection of DCI format A according to a CSS, although this is not a necessary condition.

Embodiments of the present disclosure take into consideration that there is no transport block associated with a HARQ process. Therefore, acknowledgement information for detection of DCI format A is different than conventional HARQ-ACK information. For a common reference framework, the term HARQ-ACK is used to commonly refer to HARQ-ACK information in response to a correct or incorrect detection of transport blocks for HARQ processes and in response to a correct or incorrect detection of DCI formats under the understanding that the term 'HARQ' is not applicable for the latter.

In certain embodiments, a UE procedure to report HARQ-ACK information in response to a correct on incorrect detection of a DCI format A can be same for all applicable DCI formats or can depend on the specific DCI format. For example, when DCI format A can be applicable to all UEs with RRC connection on a cell, such as when DCI format A is a DCI format 2_0 providing information for a slot structure on the cell or for switching among search space sets for PDCCH monitoring, or a DCI format 2_4 indicating cancelation of transmissions in time-frequency resources indicated by DCI format 2_4, or a DCI format activating or deactivating groupcast SPS PDSCH receptions, it can be preferable to provide a common PUCCH resource for all UEs and for UEs to provide HARQ-ACK information only when a value is a negative acknowledgement (NACK) (UE failed to detect DCI format A at a corresponding PDCCH MO). Such HARQ-ACK information can allow a serving gNB to determine whether there are any UEs that cannot detect DCI format A and then the serving gNB can accordingly adjust a CCE aggregation level or a power used for a PDCCH transmission with DCI format A.

For a DCI format A that is applicable to a group of UEs (such as any of the UE's from FIG. 1) with RRC connection (such as when DCI format A is a DCI format 2_6 providing information to a UE from the group of UEs for whether to monitor PDCCH at a next DRX cycle or whether an active DL BWP for a group of cells of the UE is a non-dormant or dormant DL BWP, or when DCI format A is a DCI format activating or deactivating groupcast SPS PDSCH receptions), it is generally preferable to provide a UE-specific PUCCH resource, for example by corresponding UE-specific RRC signaling, for each UE from the group of UEs so that a serving gNB can know whether or not the UE detected the DCI format. For example, when a UE (such as the UE 116) is indicated non-dormant DL BWPs as the active DL BWPs for a group of cells and the current active DL BWPs for the group of cells are dormant DL BWPs, HARQ-ACK information with NACK value can enable the gNB to identify the UE and avoid scheduling the UE on the group of cells, thereby avoiding a corresponding waste of resources.

The UE behavior to provide HARQ-ACK information with only NACK value, or only ACK value, or either ACK or NACK value can be specified in the system operation or be configured by the serving gNB by higher layers. The UE behavior to provide or to not provide HARQ-ACK information can also be configured by the serving gNB by higher layers. Regardless of the UE behavior for the HARQ-ACK information value that the UE provides, a corresponding PUCCH resource for PUCCH transmission with the HARQ-ACK information is separately provided for each UE.

When a common PUCCH resource is used from UEs to transmit a PUCCH with HARQ-ACK information in response to detection of DCI format A, for example only when a value is NACK, a PUCCH resource determination by a UE can be based on implicit signaling, or on explicit signaling, or a combination of implicit and explicit signaling. The UE can determine absence of detection for DCI format A when the UE does not detect the DCI format A at corresponding PDCCH monitoring occasions (MOs) based on a configuration of corresponding search space sets, or based on MOs that are additionally configured/indicated by higher layer signaling or defined in the specifications of the system operation for a specific functionality, such as for example for a DCI format A activating or deactivating groupcast SPS PDSCH receptions.

In a first approach, for explicit signaling, a configuration of the PUCCH resource can be provided by higher layers. For example, a PUCCH resource can be part of a configuration for the contents of the DCI format, or can be part of a configuration of search space sets used for PDCCH monitoring for detection of the DCI format, or can be part of a PUCCH configuration for PUCCH transmissions.

In a second approach, for implicit signaling, a UE (such as the UE 116) can determine a PUCCH resource from a configured set of PUCCH resources based on a CCE with a lowest index among the CCEs used for a reception of the PDCCH candidates providing the DCI format A. The configured set of PUCCH resources can be provided by UE-common RRC signaling, such as for example in a system information block, or by UE-specific RRC signaling such as for example in a PDSCH reception that is scheduled by a DCI format with CRC scrambled by a C-RNTI. The set of PUCCH resources can be the one associated with reporting of HARQ-ACK information that includes at most two bits. When the UE transmits a PUCCH only if a corresponding HARQ-ACK information for DCI format A has NACK value, a requirement is that the UE monitors only PDCCH candidates that have a same lowest CCE index, such as for example one PDCCH candidate with a first CCE aggregation level and a second PDCCH candidate with a second CCE aggregation level that is different than the first CCE aggregation level. In such case, the implicit PUCCH resource determination is similar to the explicit one because the UE uses a predetermined PUCCH resource based on the lowest CCE index of one or more PDCCH candidates having a same lowest CCE index for a corresponding CCE aggregation level.

For example, for a set of PUCCH resources that includes $R_{PUCCH}$ PUCCH resources, a UE can determine a PUCCH resource with index $r_{PUCCH}$, wherein $0 \leq r_{PUCCH} \leq R_{PUCCH}-1$. If $\Delta_{PRI} < R_{PUCCH}$ mod 8, then the index $r_{PUCCH}$ is described in Equation (3). Alternatively, if $\Delta_{PRI} \geq R_{PUCCH}$ mod 8, then the index $r_{PUCCH}$ is described in Equation (4).

$$r_{PUCCH} = \lfloor N_{CCE,p} \cdot \lfloor R_{PUCCH}/8 \rfloor / N_{CCE,p} \rfloor + \Delta_{PRI} \cdot \lfloor R_{PUCCH}/8 \rfloor \quad (3)$$

$$r_{PUCCH} = \lfloor n_{CCE,p} \cdot \lfloor R_{PUCCH}/8 \rfloor / N_{CCE,p} \rfloor + \Delta_{PRI} \cdot \lfloor R_{PUCCH}/8 \rfloor + R_{PUCCH} \bmod 8 \quad (4)$$

In both Equations (2) and (3), $N_{CCE,p}$ is a number of CCEs in CORESET p of the PDCCH reception with the DCI format A, $n_{CCE,p}$ is the lowest CCE index of the PDCCH candidate in CORESET p, and $\Delta_{PRI}$ is a value of a PUCCH resource indicator field in the DCI format A, if any; otherwise, $\Delta_{PRI}=0$.

Figure 10:
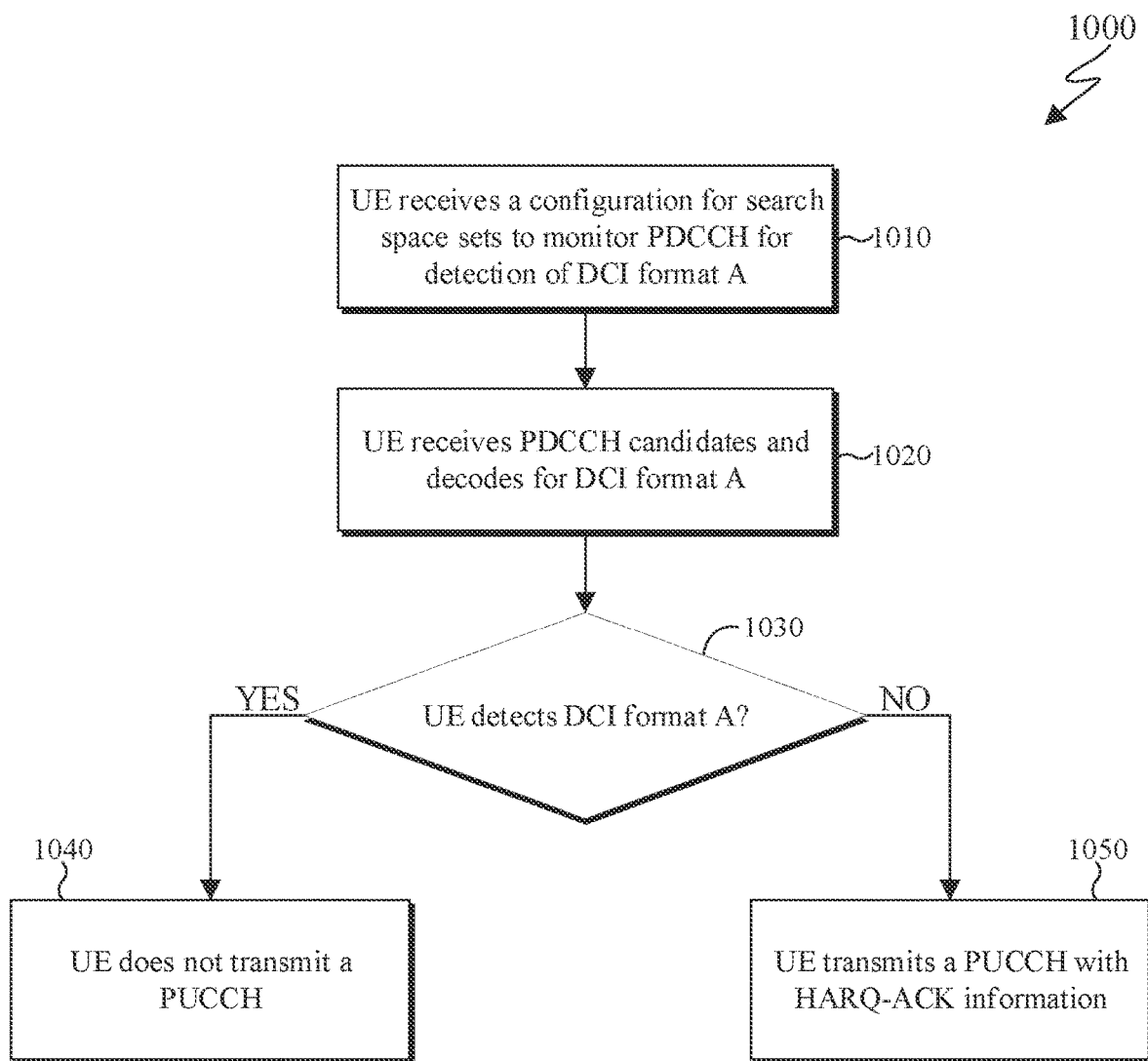
FIG. 10 illustrates an example method for a UE to provide hybrid automatic repeat request (HARK) acknowledgement (ACK) information for a detection of a DCI format A according to embodiments of the present disclosure.

FIG. 10 illustrates an example method 1000 for a UE to provide HARQ-ACK information for a detection of a DCI format A according to embodiments of the present disclosure. For example, the steps of the method 1000 can be performed by any of the UEs 111-116 of FIG. 1, such as the UE 116 of FIG. 3 and a complementary process may be performed by a BS, such as BS 102. The method 1000 of FIG. 10 is for illustration only and other embodiments can be used without departing from the scope of the present disclosure.

In step 1010, a UE (such as the UE 116) receives a configuration for search space sets to monitor PDCCH for detection of a DCI format A. At a PDCCH MO the UE receives PDCCH candidates and decodes the information according to a size and RNTI of the DCI format A (step 1020).

In step 1030, the UE determines whether a DCI format A at the PDCCH MO is detected. In response to the UE detecting the DCI format A, the UE, in step 1040 does not transmit a PUCCH with HARQ-ACK information. Alternatively, in response to the UE not detecting the DCI format A, the UE, in step 1050, transmits a PUCCH with HARQ-ACK information.

As described in the method 1000, a PUCCH resource for the PUCCH transmission is provided to the UE by higher layers or is implicitly determined by the UE based on other parameters from a configured set of PUCCH resources. The HARQ-ACK information when the UE does not detect the DCI format A is interpreted to have a NACK value.

In certain embodiments, when a UE-specific PUCCH resource is used by a UE to transmit a PUCCH with HARQ-ACK information in response to detection of a DCI format A, (such as when a value HARQ-ACK information value is either ACK or NACK), a PUCCH resource determination by a UE can be based on implicit signaling, or on explicit signaling, or a combination of implicit and explicit signaling. The UE can determine absence of detection for the DCI format A when the UE does not detect the DCI format A at PDCCH MOs for detection of the DCI format A based on a configuration of corresponding search space sets or based on a separate configuration for a functionality of DCI format A that the UE is configured to provide HARQ-ACK information in response to the DCI format A detection.

In a first approach, for explicit signaling, a configuration of a PUCCH resource can be provided by higher layers. For example, the PUCCH resource can be part of a configuration to a UE of a set of PUCCH resources used for transmission of up to two HARQ-ACK information bits. The PUCCH resource can be configured, separately from the set of PUCCH resources, for multiplexing HARQ-ACK information in response to the DCI format A detection in a PUCCH transmission using the resource, or the resource can be a predetermined resource from the set of resources, such as the first resource. When the UE does not detect the DCI format A, the UE may not transmit a PUCCH providing a NACK value (a serving gNB can then detect a discontinuous transmission (DTX) for the PUCCH), or the UE can transmit such PUCCH if the UE can assume that the PDCCH with the DCI format A was transmitted, for example based on a corresponding configured periodicity and offset that can be provided to the UE by higher layers as part of the configured parameters related to the DCI format A detection. The UE behavior for transmitting the PUCCH with NACK value or for not transmitting the PUCCH when the UE does not detect the DCI format A can be specified in the system operation or be configured to the UE from the serving gNB by higher layers.

In a second approach, for implicit signaling, a UE (such as the UE 116) can be provided a set of PUCCH resources, such as by UE-common or UE-specific RRC signaling, or as part of the DCI format A configuration. Upon receipt of the set of PUCCH resources, the UE can determine a PUCCH resource from the set of PUCCH resources for a PUCCH transmission with HARQ-ACK information based on a location of the information for the UE in the DCI format A. For example, if the DCI format A has size of $N_{DCI}$ bits excluding CRC bits and includes fields as described in Equation (5), the UE can use the resource with index $n_{field}$ from the set of PUCCH resources. Similar to the case of explicit signaling, the UE may not transmit a PUCCH or may transmit a PUCCH providing a NACK value when the UE does not detect the DCI format A and same procedures can apply.

$$N_{field} = \lfloor ((N_{DCI} - N_{other}))/M_{field} \rfloor \quad (5)$$

Here, $N_{other} \geq 0$ is a number of bits in the DCI format A that are not used for any field and $M_{field}$ is a number of bits for each field, and the first field with information for the UE has index $n_{field}$, wherein $0 \leq n_{field} \leq N_{field} - 1$.

Figure 11:
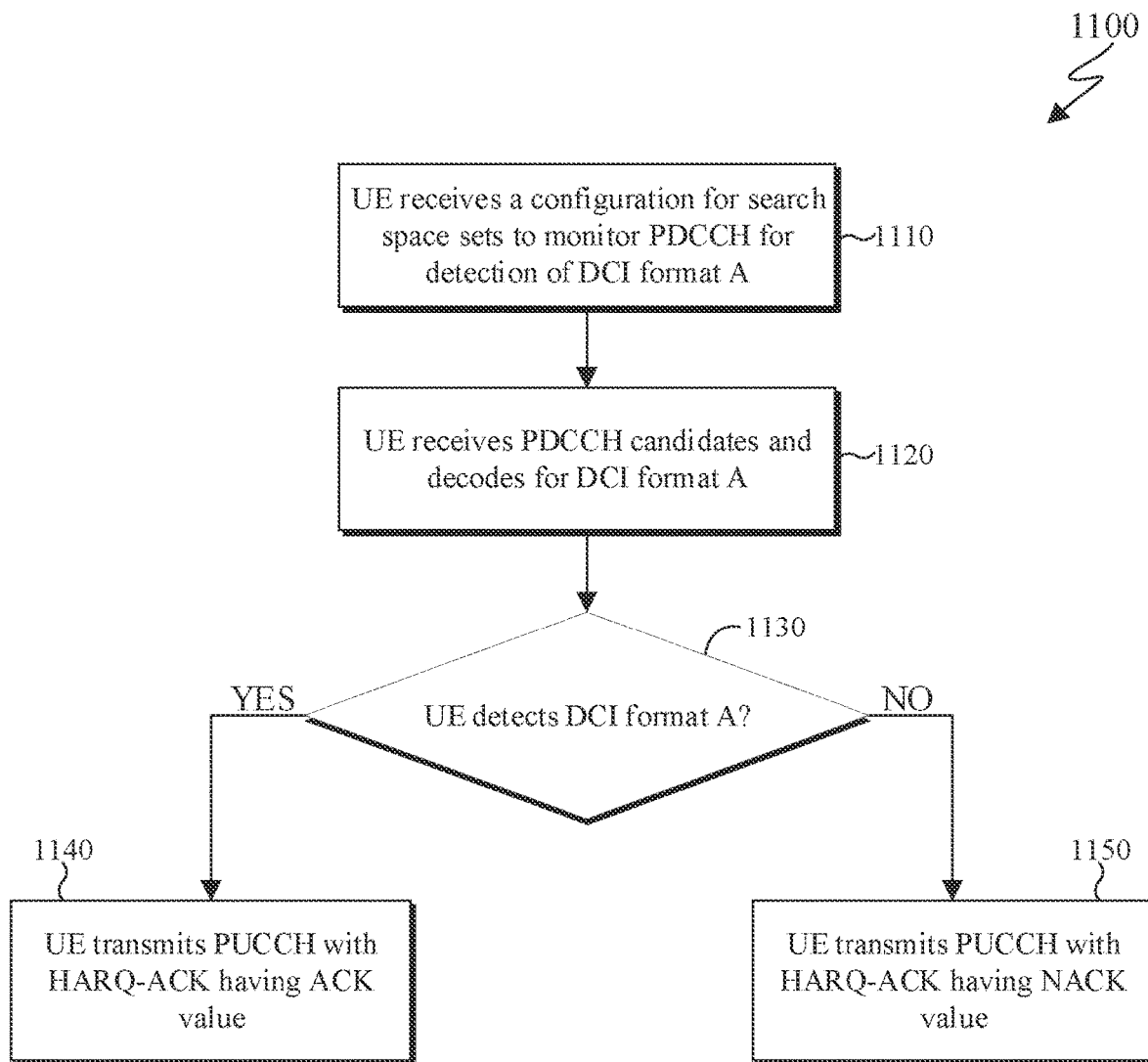
FIG. 11 illustrates an example method for a UE to provide HARQ-ACK information according to embodiments of the present disclosure.

FIG. 11 illustrates an example method 1100 for a UE to provide HARQ-ACK information according to embodiments of the present disclosure. In particular, the method 1100 describes a UE providing HARQ-ACK information for detection of a DCI format A or for failure of detection of the DCI format A. For example, the steps of the method 1100 can be performed by any of the UEs 111-116 of FIG. 1, such as the UE 116 of FIG. 3 and a complementary process may be performed by a BS, such as BS 102. The method 1100 of FIG. 11 is for illustration only and other embodiments can be used without departing from the scope of the present disclosure.

In step 1110, a UE (such as the UE 116) receives a configuration for search space sets to monitor PDCCH for detection of a DCI format A. At a PDCCH MO the UE receives PDCCH candidates and decodes the information according to a size and RNTI of the DCI format A (step 1120).

In step 1130, the UE determines whether the UE detects the DCI format A at the PDCCH MO. When the UE detects the DCI format A, the UE, in step 1140, transmits a PUCCH with HARQ-ACK information having an ACK value. Alternatively, when the UE does not detect the DCI format A, the UE, in step 1150, transmits a PUCCH with HARQ-ACK information having a NACK value.

It is also possible that the UE does not transmit a PUCCH when the UE does not detect the DCI format A. A PUCCH resource for the PUCCH transmission is provided to the UE by higher layers or is implicitly determined by the UE.

With reference to slots of PUCCH transmission, a slot for the transmission of the PUCCH with the HARQ-ACK information can be configured to be n slots after a slot of the corresponding PDCCH MO for candidate PDCCH receptions with the DCI format A or the value of n can be specified in the system operation such as n=0 slots, wherein the value of n can also depend on the SCS configuration for the PUCCH transmission. When there are no PUCCH resources available after n slots from the slot of the PDCCH MO, the PUCCH transmission can be in the first slot after n slots that includes a PUCCH resource for the PUCCH transmission.

Although FIGS. 10 and 11 illustrate the methods 1000 and 1100 various changes may be made to FIGS. 10 and 11. For example, while the method 1000 of FIG. 10 and the method 1100 of FIG. 11 are shown as a series of steps, various steps could overlap, occur in parallel, occur in a different order, or occur multiple times. In another example, steps may be omitted or replaced by other steps. For example, steps of the method 1000 can be executed in a different order.

Embodiments of the present disclosure also describe multiplexing HARQ-ACK information for a DCI format A and HARQ-ACK information for PDSCH receptions. The following examples and embodiments, such as those described in FIGS. 12 and 13 describe multiplexing HARQ-ACK information for a DCI format A and HARQ-ACK information for PDSCH receptions.

An embodiment of the disclosure describes a procedure for a UE to multiplex other UCI types with HARQ-ACK information for a decoding outcome of a DCI format A (referred to as first HARQ-ACK information) when a first PUCCH transmission with the first HARQ-ACK information would overlap in time with a second PUCCH transmission or a PUSCH transmission with the other UCI types. The other UCI types include a scheduling request, or a CSI report, or HARQ-ACK information for decoding outcomes of transport blocks in PDSCH receptions (referred to as second HARQ-ACK information). The second embodiment is also applicable to DCI format B.

In a first approach, a UE (such as the UE 116) does not multiplex first HARQ-ACK information with any of the other UCI types in a same PUCCH or PUSCH transmission. The UE behavior to transmit either only the first PUCCH or only the second PUCCH or PUSCH can be specified in the system operation or can be configured by a serving gNB through higher layers. The UE behavior can also depend on whether the UE transmits the first PUCCH only when a HARQ-ACK information value is NACK or transmits the first PUCCH regardless of the HARQ-ACK information value. For example, the second HARQ-ACK information can utilize different reception reliability than the first HARQ-ACK information and the gNB can configure the UE to transmit only either the first or the second HARQ-ACK information. When a UE does not multiplex first HARQ-ACK information with second HARQ-ACK information and for enabling different reception reliability to the first and second HARQ-ACK information, the UE can be provided by higher layers separate configurations for a target power setting $P_{O,PUCCH}$ of an open-loop power control component that controls a PUCCH transmission power or for the parameters $\beta_{offset}^{HARQ-ACK}$ or $\alpha$ that are used for determining a number of coded modulation symbols and a maximum number of REs used for HARQ-ACK multiplexing in a PUSCH.

The UE behavior for multiplexing first HARQ-ACK information with other UCI types can be separately configured per UCI type. For example, the UE can be configured to multiplex first and second HARQ-ACK information in a PUCCH and configured to not multiplex first HARQ-ACK information and SR or CSI report in a PUCCH and, in case of such overlapping, transmit only the first PUCCH and drop transmission of the second PUCCH. The UE behavior can also be configured depending on a payload for the other UCI information. For example, when a payload for second HARQ-ACK information is larger than a threshold value, multiplexing with first HARQ-ACK information is enabled; otherwise, it is not. The payload threshold value can be configured by higher layers or it can be specified in the system operation such as for example to be equal to 2.

In a second approach, a UE (such as the UE 116) multiplexes first HARQ-ACK information with second HARQ-ACK information. If the UE has a PDCCH MO for detection of the DCI format A and the UE multiplexes corresponding first HARQ-ACK information in a same PUCCH as for second HARQ-ACK information, for example because a PUCCH resource for transmission of a first PUCCH with first HARQ-ACK information overlaps with a PUCCH resource for transmission of a second PUCCH with second HARQ-ACK information in a slot, the UE generates one HARQ-ACK information bit associated with the PDCCH MO for the DCI format A. If the UE is configured to transmit the first PUCCH only when the first HARQ-ACK information has a NACK value, and to multiplex the first HARQ-ACK information with the second HARQ-ACK information regardless of a value of the first HARQ-ACK information, and the UE reports an ACK value when the UE detects the DCI format; otherwise, the UE reports a NACK value.

For HARQ-ACK information report generated according to a Type-1 HARQ-ACK codebook, PDCCH MOs for the DCI format A, or a separately configured subset of those PDCCH MOs, are included in the determination of the Type-1 HARQ-ACK codebook. In a first approach, when a PUCCH transmission in a slot includes a Type-1 HARQ-ACK codebook for receptions corresponding to a number of slots that include D PDCCH MOs for the DCI format, such as D=1, the UE generates a HARQ-ACK information bit for each PDCCH MO corresponding to a detection outcome of the DCI format A and appends it to the Type-1 HARQ-ACK codebook (that is, the UE appends D HARQ-ACK information bits for the DCI format A detection according to an ascending order for a corresponding PDCCH MO in the Type-1 HARQ-ACK codebook).

In a third approach, each PDCCH MO is treated as a virtual PDSCH reception by adding a corresponding row index in a set of row indexes of a table associated with the active DL BWP, wherein the table defines respective sets of slot offsets, start and length indicators SLIV, and PDSCH mapping types for PDSCH receptions, and a location for corresponding HARQ-ACK information for the PDCCH MO is the one corresponding to the virtual PDSCH reception.

When a UE is configured to multiplex first and second HARQ-ACK information in a Type-1 HARQ-ACK codebook, and the UE reports HARQ-ACK information only for first HARQ-ACK information for all occasions for candidate PDSCH receptions, the UE determines a Type-1 HARQ-ACK codebook only for the first HARQ-ACK information.

Figure 12:
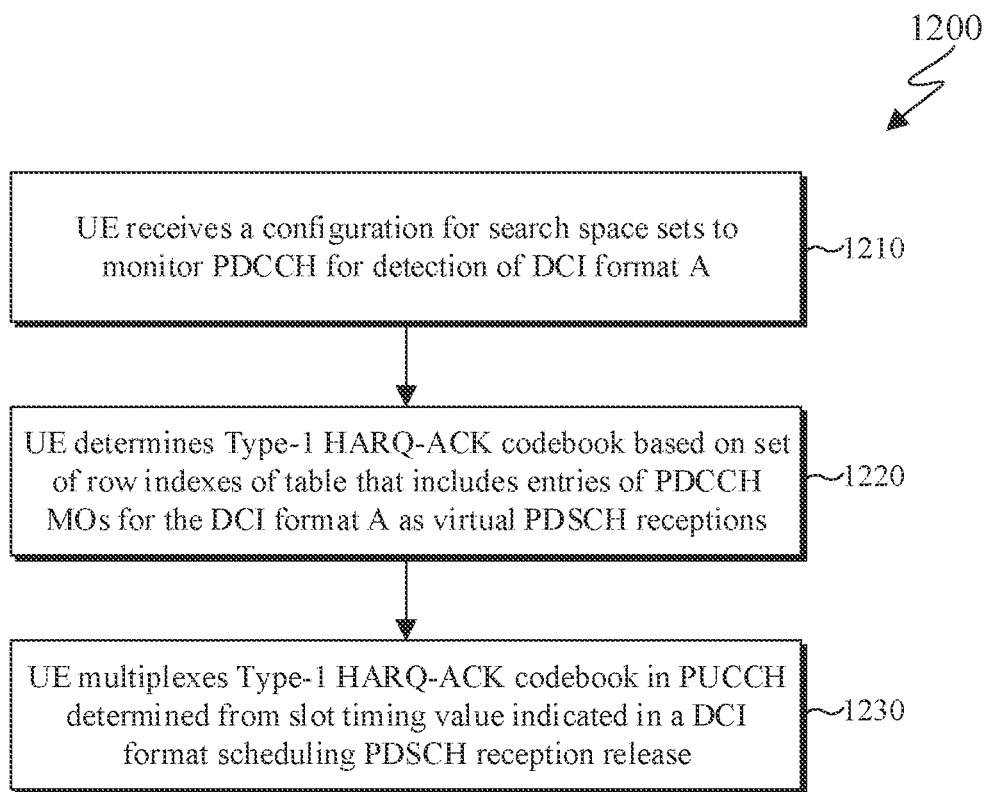
FIG. 12 illustrates an example method for a UE to include HARQ-ACK information for detection of a DCI format A in a Type-1 HARQ-ACK codebook according to embodiments of the present disclosure.

FIG. 12 illustrates an example method 1200 for a UE to include HARQ-ACK information for detection of a DCI format A in a Type-1 HARQ-ACK codebook according to embodiments of the present disclosure. For example, the steps of the method 1200 can be performed by any of the UEs 111-116 of FIG. 1, such as the UE 116 of FIG. 3. The method 1200 of FIG. 12 is for illustration only and other embodiments can be used without departing from the scope of the present disclosure.

In step 1210, a UE (such as the UE 116) receives a configuration for search space sets to monitor PDCCH for detection of a DCI format A.

Based on (i) a set of slot timing values for PUCCH transmission, (ii) a set of row indexes of a table defining parameters for PDSCH receptions, (iii) PDCCH MOs for a DCI format A, and (iv) other configurations such as a TDD UL-DL configuration defining when the UE can receive PDSCH or PDCCH or transmit PUCCH, the UE, in step 1220, determines a Type-1 HARQ-ACK codebook to transmit in a PUCCH, wherein the set of row indexes of the table for determining PDSCH receptions includes entries corresponding to the PDCCH MOs.

In step 1230, the UE multiplexes the Type-1 HARQ-ACK codebook in a PUCCH transmission in a slot determined according to a slot timing value indicated by a DCI format scheduling a PDSCH reception.

For HARQ-ACK information report generated according to a Type-2 HARQ-ACK codebook, when a PUCCH transmission in a slot includes a Type-2 HARQ-ACK codebook for receptions corresponding to a number of slots that include D PDCCH MOs for the DCI format A, such as D=1, the UE generates a HARQ-ACK information bit for each PDCCH MO corresponding to a detection outcome of the DCI format and appends it to the Type-1 HARQ-ACK codebook (that is, the UE appends D HARQ-ACK information bits for the DCI format A detection according to an ascending order for a corresponding PDCCH MO in the Type-2 HARQ-ACK codebook). Unlike DCI formats scheduling PDSCH receptions, the DCI format A is assumed to not include counter and total downlink assignment index (DAI) fields and, for the purposes of Type-2 HARQ-ACK generation, the DCI format A is treated in a similar manner as a SPS PDSCH reception.

Figure 13:
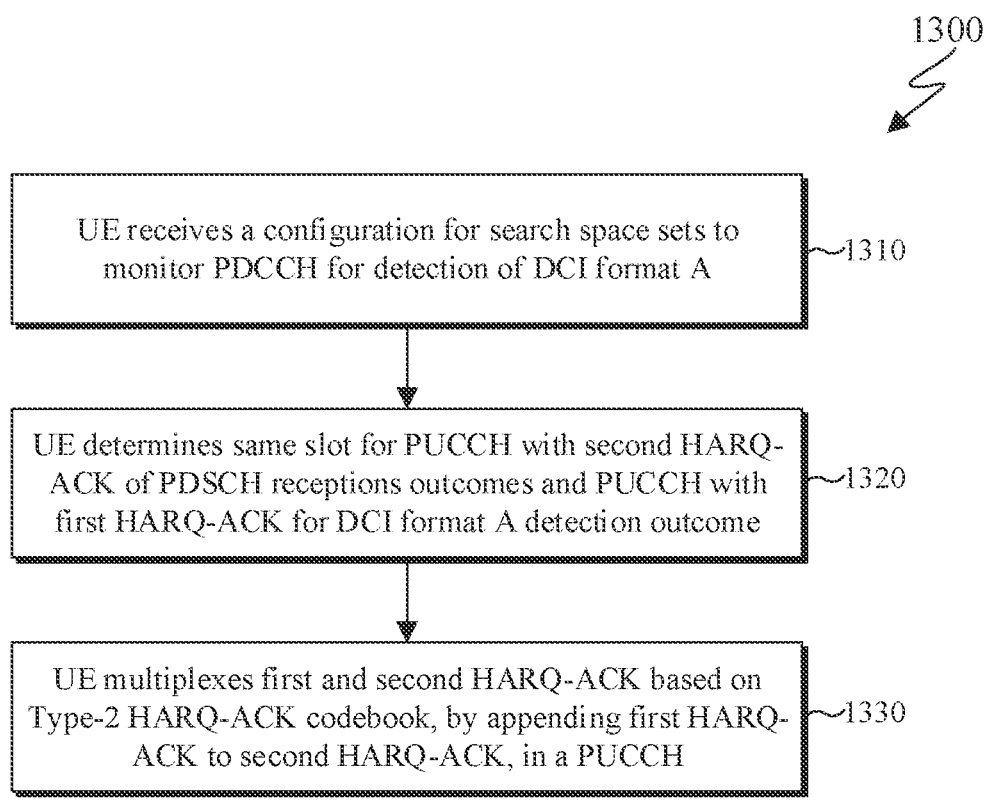
FIG. 13 illustrates an example method for a UE to include HARQ-ACK information for detection of a DCI format A in a Type-2 HARQ-ACK codebook according to embodiments of the present disclosure.

FIG. 13 illustrates an example method 1300 for a UE to include HARQ-ACK information for detection of a DCI format A in a Type-2 HARQ-ACK codebook according to embodiments of the present disclosure. For example, the steps of the method 1300 can be performed by any of the UEs 111-116 of FIG. 1, such as the UE 116 of FIG. 3 and a complementary process may be performed by a BS, such as BS 102. The method 1300 of FIG. 13 is for illustration only and other embodiments can be used without departing from the scope of the present disclosure.

In step 1310, a UE (such as the UE 116) receives a configuration for search space sets to monitor PDCCH for detection of a DCI format A.

With reference to slots of PUCCH transmission and based on slots of PDSCH receptions and slots indicated for PUCCH transmission with corresponding first HARQ-ACK information by DCI formats scheduling the PDSCH receptions, the UE, in step 1320, determines a slot for a PUCCH transmission with second HARQ-ACK information that is same as a slot for a PUCCH transmission with first HARQ-ACK information for a detection outcome of the DCI format A.

In step 1330, the UE multiplexes first and second HARQ-ACK information based on a Type-2 HARQ-ACK codebook wherein the first HARQ-ACK information is appended to the second HARQ-ACK information in the PUCCH transmission.

Although FIGS. 12 and 13 illustrate the methods 1200 and 1300 various changes may be made to FIGS. 12 and 13. For example, while the method 1200 of FIG. 12 and the method 1300 of FIG. 13 are shown as a series of steps, various steps could overlap, occur in parallel, occur in a different order, or occur multiple times. In another example, steps may be omitted or replaced by other steps. For example, steps of the method 1200 can be executed in a different order.

Embodiments of the present disclosure also describe multiplexing HARQ-ACK information for groupcast PDSCH receptions and for unicast PDSCH receptions. The following examples and embodiments, such as those described in FIG. 14 describe multiplexing HARQ-ACK information for groupcast and unicast PDSCH receptions.

An embodiment of the disclosure describes a procedure for a UE to provide first HARQ-ACK information in response to groupcast PDSCH (G-PDSCH) receptions and to multiplex first HARQ-ACK information with other UCI types such as HARQ-ACK information for unicast PDSCH (U-PDSCH) receptions.

In certain embodiments, a UE is configured to provide HARQ-ACK information in response to G-PDSCH receptions either only when a corresponding value is NACK or regardless of a HARQ-ACK value. When the UE is configured to provide HARQ-ACK information only when it has NACK value, if the HARQ-ACK information is only in response to G-PDSCH receptions, a serving gNB cannot be aware of whether absence of a PUCCH reception is due to all UEs correctly decoding a transport block in a corresponding G-PDSCH reception or due to at least some UEs not detecting the DCI format B scheduling the G-PDSCH reception. To avoid that problem, embodiments of the present disclosure take into consideration that, for PDCCH MOs where a UE is configured to detect a DCI format B scheduling a G-PDSCH reception, the UE transmits a PUCCH when the UE does not detect the DCI format B and such PUCCH transmission provides a NACK value for either a failure to detect (failure to correctly decode after attempting to decode) the DCI format B or, when any, for failure to correctly decode a transport block in the G-PDSCH reception. Therefore, when the UE is configured to transmit a PUCCH when the UE does not correctly decode a transport block for a G-PDSCH, the UE transmits the PUCCH for each PDCCH MO, or for a configured subset of PDCCH MOs, for scheduling a G-PDSCH reception or for activation/deactivation of a semi-persistently scheduled G-PDSCH reception, both when the UE does not detect a DCI format B scheduling a G-PDSCH reception and when the UE does not correctly decode a transport block in a G-PDSCH reception. Further, as the PUCCH transmission indicates a NACK value for the decoding of the transport block, additional information can be provided and a HARQ-ACK information bit value of '0', for example, can indicate that the UE did not correctly decode a DCI format scheduling a G-PUSCH reception while a value of '1' can indicate that the UE did not correctly decode a transport block in the G-PDSCH reception wherein, for example, the UE can provide the different indications by transmitting a sequence-based (without modulation symbols) PUCCH in different corresponding PUCCH resources. When a UE transmits a PUCCH with HARQ-ACK information also for the case that the UE does not detect a DCI format B scheduling a G-PDSCH reception, a PUCCH resource and a PUCCH transmission slot, relative to a slot of a corresponding PDCCH MO, are configured by higher layers.

Figure 14:
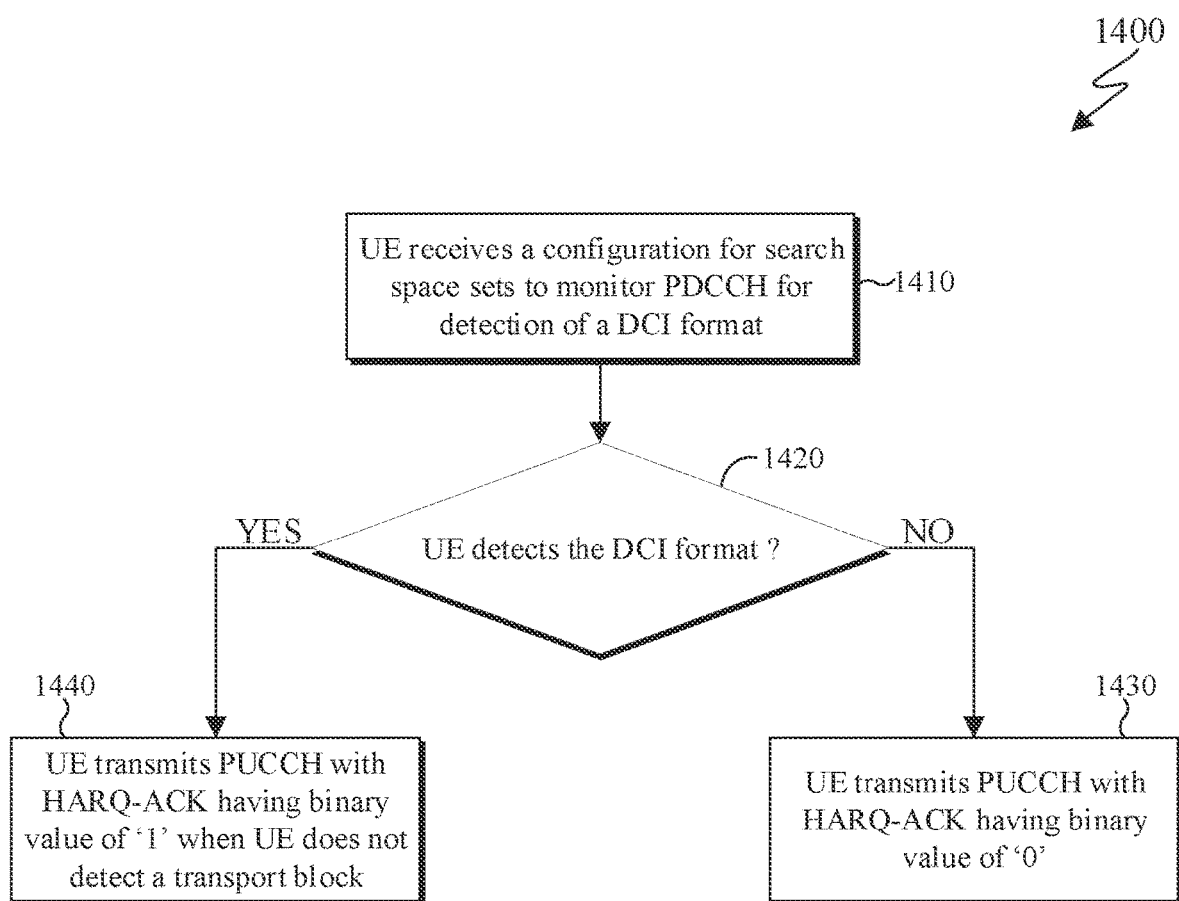
FIG. 14 illustrates an example method for a UE to provide HARQ-ACK information with negative acknowledgement (NACK) value according to embodiments of the present disclosure.

FIG. 14 illustrates an example method 1400 for a UE to provide HARQ-ACK information with NACK value according to embodiments of the present disclosure. The method 1400 describes a procedure for the UE to provide HARQ-ACK information with NACK value for failure to detect a DCI format scheduling a PDSCH reception or for failure to detect a transport block in a PDSCH reception scheduled by the DCI format. For example, the steps of the method 1400 can be performed by any of the UEs 111-116 of FIG. 1, such as the UE 116 of FIG. 3 and a complementary process may be performed by a BS, such as BS 102. The method 1400 of FIG. 14 is for illustration only and other embodiments can be used without departing from the scope of the present disclosure.

In step 1410, a UE (such as the UE 116) receives a configuration for search space sets to monitor PDCCH for detection of a DCI format. In step 1420, the UE determines whether a DCI format is detected. When the UE does not detect the DCI format, the UE, is step 1430, transmits a PUCCH in a first PUCCH resource. Alternatively, when the UE detects the DCI format and does not correctly decode a transport block in a PDSCH reception scheduled by the DCI format, the UE, in step 1440, transmits a PUCCH in a second PUCCH resource.

In the above example, the UE does not transmit a PUCCH when the UE detects the DCI format and the transport block in the PDSCH reception scheduled by the DCI format. The first or the second PUCCH resource for the PUCCH transmission is provided to the UE by higher layer signaling or is implicitly determined by the UE, for example based on a first index of a CCE for PDCCH candidates that provide the DCI format.

Although FIG. 14 illustrates the method 1400 various changes may be made to FIG. 14. For example, while the method 1400 of FIG. 14 is shown as a series of steps, various steps could overlap, occur in parallel, occur in a different order, or occur multiple times. In another example, steps may be omitted or replaced by other steps. For example, steps of the method 1400 can be executed in a different order.

In certain embodiments, a UE transmits a PUCCH only when a corresponding value is NACK and only to indicate incorrect decoding of a transport block in a G-PDSCH reception, a serving gNB needs to separately set a received power threshold for the PUCCH for a DTX-to-NACK probability when the PUCCH is received only when the HARQ-ACK information is NACK and a received power threshold for the PUCCH for a DTX-to-ACK probability when the PUCCH is received when HARQ-ACK information is either ACK or NACK. A DTX-to-ACK probability can be set to 1% because it is further conditioned on the UE failing to detect a DCI format triggering a PUCCH transmission with HARQ-ACK information that typically has a corresponding probability of 1%. As the two events are not correlated, the combined event that a UE fails to detect a DCI format and the gNB makes an associated DTX-to-ACK error has a combined probability of 0.01%. For a G-PDSCH reception, when a UE transmits a PUCCH only to indicate HARQ-ACK information with NACK value in response to an incorrect transport block decoding, the combined event of a DTX-to-ACK error is 1% as it corresponds to a probability for failure to detect the DCI format B assuming that the remaining UEs, if any, correctly decoded the transport block. It is noted that in order to minimize retransmissions, a target BLER for the transport block is likely to be small because, otherwise, a likelihood for retransmissions is large assuming independent decoding outcomes for a transport block among UEs and multiple UEs for the G-PDSCH reception. Further, even when all UEs detect DCI format B, a DTX-to-NACK probability should be small, such as 0.01%, because, otherwise, the serving gNB is likely to determine DTX with a larger probability which, in case of PUCCH transmission only with NACK information, would actually correspond to a NACK-to-ACK error.

To achieve a small DTX-to-NACK probability (and a small NACK-to-DTX probability), a PUCCH reception power should be substantially larger than a noise level so that an actual PUCCH reception would be highly unlikely to be misinterpreted as absence of PUCCH reception, at least when only a few UEs transmit PUCCH in a PUCCH resource to indicate NACK. Therefore, a PUCCH transmission power with only NACK information should be possible to be larger, or generally different, than a PUCCH transmission power with either ACK or NACK information. In one approach, a serving gNB can provide by higher layers to a UE a power offset $P_{offset}$ for the UE to add to a PUCCH transmission power when the PUCCH transmission occurs only for NACK information, or can equivalently provide separate configurations for a $P_{O\_PUCCH}$ value depending on whether a UE transmits a PUCCH only to indicate a NACK value or to indicate either a NACK or ACK value for HARQ-ACK information. In a second approach, for the same purpose, the gNB can configure to the UE a set of PUCCH nominal power reception values $P_{O\_PUCCH}$ and can indicate one of the values by the DCI format B scheduling the G-PDSCH reception. As a TPC command field is not meaningful for G-PDSCH receptions by multiple UEs, the TPC command field in DCI format B can be re-purposed to indicate a value from the set of $P_{O\_PUCCH}$ values. In a third approach, a UE can maintain separate closed-loop power control states for respective first PUCCH transmissions in response to G-PDCCH receptions and second PUCCH transmissions in response to U-PDCCH receptions. A first closed-loop power control state for first PUCCH transmissions can be same as a second closed-loop power control state for second PUCCH transmissions with the exception of additionally accumulating TPC command values provided by DCI format B for the first closed-loop power control state.

A UE can also be configured to not provide HARQ-ACK information for a G-PDSCH reception (or for a detection of a DCI format scheduling a G-PDSCH reception). A further restriction is that such configuration is applicable only when, otherwise, the UE would provide HARQ-ACK information with either ACK or NACK value in response to a transport block decoding in a G-PDSCH reception (and is not applicable when the UE would provide HARQ-ACK information only when a value is NACK). Alternatively, first and second UEs can be separately indicated whether or not to provide HARQ-ACK information depending on whether the first UE is configured to transmit PUCCH only when a HARQ-ACK information value is NACK and the second UE is configured to transmit PUCCH regardless of a HARQ-ACK information value. A motivation is that UEs with lower signal-to-interference and noise ratio (SINR) values are more likely to incorrectly decode a DCI format scheduling a G-PDSCH reception or a transport block in a G-PDSCH reception. A serving gNB can then configure only first UEs with SINR values below a gNB selected threshold value to provide HARQ-ACK information for G-PDSCH receptions as, when all first UEs provide HARQ-ACK information with ACK value it is practically certain that the remaining UEs would also provide a same value while when some of the first UEs provide HARQ-ACK information with NACK value, HARQ-ACK information from remaining UEs will not be useful to the serving gNB when the serving gNB retransmits the corresponding transport block in a subsequent G-PDSCH.

A UE can be separately configured a HARQ-ACK codebook type for first HARQ-ACK information corresponding to G-PDSCH receptions and for second HARQ-ACK information corresponding to unicast PDSCH (U-PDSCH) receptions. The UE can also be configured whether or not to multiplex the first HARQ-ACK information and the second HARQ-ACK information in a same PUCCH when a first PUCCH transmission with the first HARQ-ACK information would overlap with a second PUCCH transmission with the second HARQ-ACK information in a slot, or whether to transmit only one of the first PUCCH and the second PUCCH. The configuration can be provided by higher layers or can be specified in the system operation. A PUCCH transmission can include a Type-1 HARQ-ACK codebook, for example for G-PDSCH receptions, and a Type-2 HARQ-ACK codebook, for example for U-PDSCH receptions. A joint encoding can apply for the two HARQ-ACK codebooks when a reception reliability is same for each HARQ-ACK codebook while a separate encoding can apply when the two HARQ-ACK codebooks can have different reception reliabilities.

When separate encoding applies between the first HARQ-ACK codebook and the second HARQ-ACK codebook, a UE (such as the UE 116) determines a PUCCH transmission power based on the HARQ-ACK codebook using the larger reception reliability. For example, when the first HARQ-ACK codebook uses a larger reception reliability, the UE determines a PUCCH transmission power using same settings as when only the first HARQ-ACK codebook is multiplexed in the PUCCH. Further, the UE can be provided a first maximum code rate $r_1$ and a second maximum code rate $r_2$, or a code rate offset $r_{offset}$ to obtain Equation (6) and determine a number of RBs for a PUCCH transmission as a minimum number of RBs $M_{RB,min}^{PUCCH}$ satisfying the condition of Equation (7).

$$r_2 = r_1 + r_{offset} \quad (6)$$

$$\frac{O_{ACK,1} + O_{other,1} + O_{CRC,1}}{r_1} + \frac{O_{ACK,2} + O_{other,2} + O_{CRC,2}}{r_2} \leq \quad (7)$$

$$M_{RB,min}^{PUCCH} \cdot N_{sc,ctrl}^{RB} \cdot N_{symb-UCI}^{PUCCH} \cdot Q_m$$

Here, for j=1, 2, $O_{ACK,j}$ is a number of HARQ-ACK information bits for the first and second HARQ-ACK codebooks, $O_{other,j}$ is a number of other UCI bits (if any; otherwise $O_{other,j}$=0), such as for SR or CSI associated with a same service as a respective $O_{ACK,j}$, $O_{CRC,j}$ is a number of respective CRC bits for the first UCI codeword and the second UCI codeword, $N_{sc,ctrl}^{RB}$ is a number of subcarriers per RB that are used to multiplex UCI (excluding subcarriers per RB used to multiplex DMRS), $N_{symb-UCI}^{PUCCH}$ is a number of symbols of the PUCCH transmission that are used to multiplex UCI (excluding symbols used to multiplex DMRS), and $Q_m$ is a modulation order for the UCI multiplexing in the PUCCH transmission. The above determination for a power and a number of RBs of a PUCCH transmission is generally applicable in case a UE multiplexes in a same PUCCH transmission UCI types having different corresponding reception reliabilities such as for example when a first UCI type is for ultra-reliable services and a second UCI type is for mobile broad-band (MBB) services.

When separate encoding applies between the first HARQ-ACK codebook and the second HARQ-ACK codebook, a UE can reserve in a PUSCH transmission a first number of REs for multiplexing up to a certain number of bits for the first codebook, such as two bits, and a second number of REs for multiplexing up to a certain number of bits for the second codebook, such as one bit.

For G-PDSCH receptions, a Type-1 HARQ-ACK codebook can be constructed as a Type-1 for unicast PDSCH receptions by using slot timing values, a time domain resource allocation (TDRA) table, and a SCS configuration corresponding to the G-PDSCH receptions. When HARQ-ACK information for detection of a DCI format scheduling a G-PDSCH reception also should be provided, the TDRA table can additionally include entries for virtual G-PDSCH receptions that correspond to PDCCH MOs for the DCI format scheduling a G-PDSCH reception. Further, when the UE can assume that only a single G-PDCCH reception is scheduled between successive PDCCH MOs for the DCI format scheduling a G-PDSCH reception, the TDRA table can include only PDCCH MOs for the DCI format scheduling G-PDSCH receptions.

For a Type 2 HARQ-ACK codebook, as G-PDSCH receptions are by a group of UEs while U-PDSCH receptions are by a single UE, DAI field values are independently set in first DCI formats scheduling CG-PDSCH receptions and in second DCI formats scheduling unicast PDSCH receptions and corresponding first and second Type-2 HARQ-ACK codebooks are independently constructed. When a UE multiplexes first and second Type-2 HARQ-ACK codebooks in a PUCCH transmission in a slot, the UE can append the first HARQ-ACK codebook to the second HARQ-ACK codebook (or the reverse). The UE determines a PUCCH resource for the PUCCH transmission in the slot based on a DCI format, from the first or second DCI formats, that the UE detects in a last PDCCH MO that the UE is indicated to provide HARQ-ACK information in the slot.

For multiplexing of HARQ-ACK information codebooks in a PUSCH, similar principles as for multiplexing in a PUCCH can apply. A UE can be configured whether or not to multiplex HARQ-ACK information in response to G-PDSCH receptions in a PUSCH transmission. When the UE is configured such multiplexing and for joint coding of the first and second HARQ-ACK codebooks, a second HARQ-ACK codebook, such as one corresponding to G-PDSCH receptions, can be appended to a first HARQ-ACK codebook, such as one corresponding to U-PDSCH receptions. For separate coding of the two HARQ-ACK codebooks, a UE can be provided separate values of $\beta_{offset,1}^{HARQ-ACK}$ and $\beta_{offset,2}^{HARQ-ACK}$ to determine respective first and second numbers of coded modulation symbols for multiplexing in the PUSCH transmission. In case a value of $\beta_{offset,1}^{HARQ-ACK}$ is indicated by a DCI format scheduling the PUSCH transmission, the indication can also be for a value of $\beta_{offset,2}^{HARQ-ACK}$ or the UE can be configured an offset $O_\beta$ to apply to an index of a table entry that corresponds to the indicated $\beta_{offset,1}^{HARQ-ACK}$ and obtain an index of a table entry mapping to $\beta_{offset,2}^{HARQ-ACK}$. If the index would be smaller than or larger than the minimum or maximum index of a table entry, the UE determines $\beta_{offset,2}^{HARQ-ACK}$ to be the one corresponding to the table entry with the minimum or maximum index, respectively.

Embodiments of the present disclosure also describe PDCCH monitoring and scheduling groupcast PDSCH receptions or unicast PDSCH receptions. The following examples and embodiments, such as those described in FIG. 15 describe PDCCH monitoring and scheduling groupcast PDSCH receptions or unicast PDSCH receptions.

An embodiment of the disclosure describes PDCCH monitoring aspects for detection of DCI format B scheduling G-PDSCH receptions. When a UE monitors PDCCH for detection of DCI format B according to CSS, the UE prioritizes allocation of a PDCCH monitoring capability to G-PDSCH receptions over U-PDSCH receptions. Such UE behavior can be detrimental, for example when a U-PDSCH reception has a larger priority than a G-PDSCH reception. As a G-PDSCH reception is by multiple UEs, a serving gNB should be able to transmit a PDCCH in a slot to schedule a G-PDSCH reception while also being able to transmit another PDCCH in the slot to schedule a U-PDSCH reception or a PUSCH transmission. However, when a UE always prioritizes allocation of the PDCCH monitoring capability for receptions of PDCCH candidates that the UE monitors according to CSS for search space sets associated with DCI format B, the UE may not have sufficient PDCCH monitoring capability to receive PDCCH candidates that the UE monitors according to USS for scheduling U-PDSCH receptions or PUSCH transmissions.

In a first approach, a UE monitors PDCCH candidates for detection of DCI format B according to USS. A new RNTI, G-RNTI, is introduced for scrambling the CRC bits of the DCI format and the USS is initialized by $Y_{p,-1}=n_{RNTI}\neq 0$ where the RNTI value used for $n_{RNTI}$ is the G-RNTI.

In a second approach, a UE monitors PDCCH candidates for detection of DCI format B according to CSS. A new RNTI, G-RNTI, is introduced for scrambling the CRC bits of DCI format B. The CSS can be initialized by $Y_{p,-1}=0$ or, to avoid collisions of PDCCH candidates for DCI format B with PDCCH candidates of other DCI formats that the UE monitors PDCCH according to CSS, by $Y_{p,-1}=G$ where G is provided by higher layers for example together with the configuration of search space sets for DCI format B. However, search space sets the UE is configured for monitoring PDCCH candidates according to CSS for detection of DCI format B are not prioritized over all search space sets the UE is configured for monitoring PDCCH candidates according to USS. The UE can be configured to prioritize allocation of PDCCH candidates and non-overlapping CCEs for a number of search space sets associated with monitoring PDCCH candidates according to USS over search space sets associated with monitoring PDCCH candidates according to CSS for detection of DCI format B, or the number can be specified in the system operation such as one search space set. For example, the configuration can be based on a corresponding search space set index. There is no change to first prioritizing allocation of PDCCH candidates/non-overlapping CCEs to CSS sets that are not only associated with DCI format B.

Figure 15:
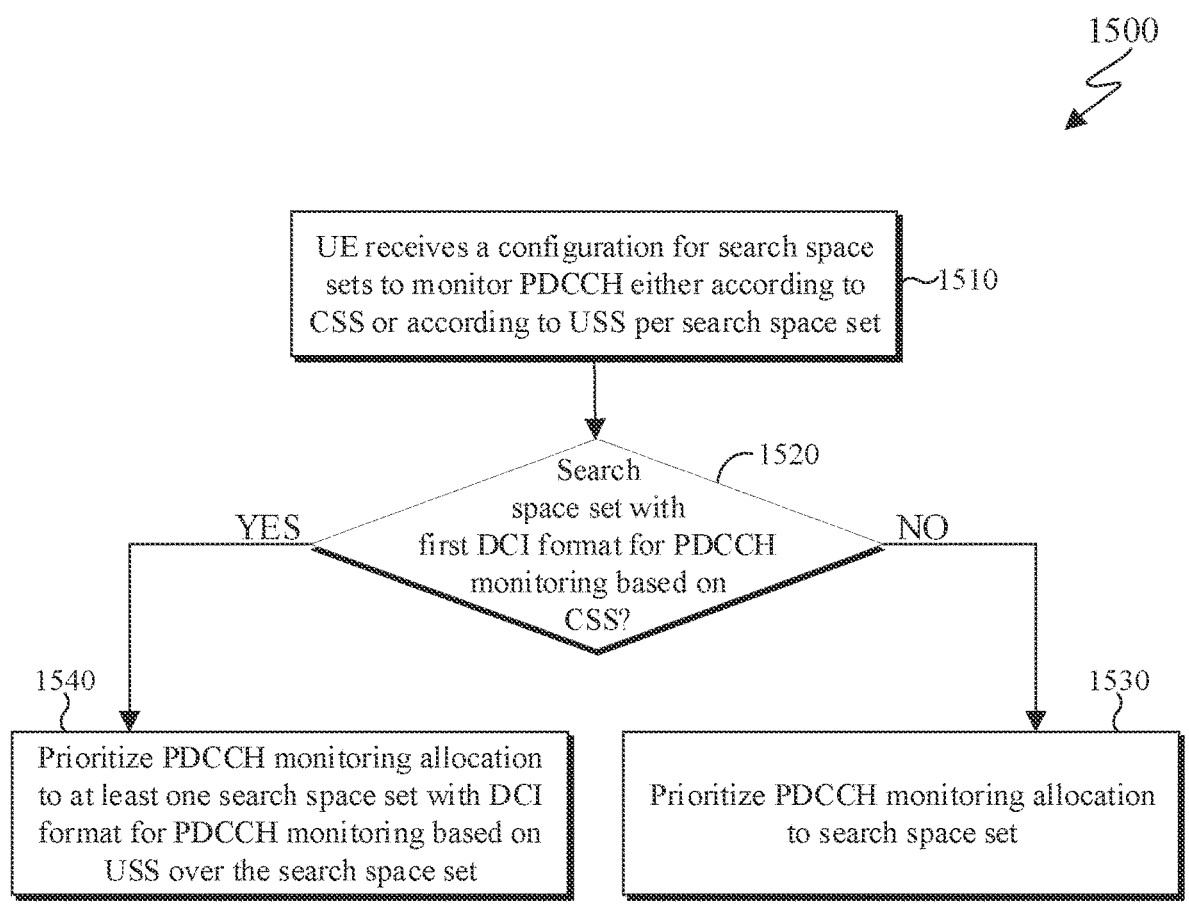
FIG. 15 illustrates an example method for a UE to allocate PDCCH candidates and non-overlapping CCEs t search space sets embodiments of the present disclosure.

FIG. 15 illustrates an example method 1500 for a UE to allocate PDCCH candidates and non-overlapping CCEs to search space sets embodiments of the present disclosure. For example, the steps of the method 1500 can be performed by any of the UEs 111-116 of FIG. 1, such as the UE 116 of FIG. 3 and a complementary process may be performed by a BS, such as BS 102. The method 1500 of FIG. 15 is for illustration only and other embodiments can be used without departing from the scope of the present disclosure.

In step 1510, A UE (such as the UE 116) receives a configuration for search space sets to monitor PDCCH either according to CSS or according to USS per search space set. In step 1520, the UE determines whether a DCI format associated with a search space set for PDCCH monitoring according to CSS is a first DCI format, such as DCI format B. When the DCI format is not the first DCI format, the UE, in step 1530, prioritizes allocation of PDCCH candidates and non-overlapping CCEs to the search space set over any search space set where the UE monitors PDCCH for detection of DCI formats according to USS. Alternatively, when the DCI format is the first DCI format, the UE, in step 1540, prioritizes over the search space set, based for example on a respective search space index, allocation of PDCCH candidates and non-overlapping CCEs to at least one search space set where the monitors PDCCH for detection of DCI formats according to USS.

Although FIG. 15 illustrates the method 1500 various changes may be made to FIG. 15. For example, while the method 1500 of FIG. 15 is shown as a series of steps, various steps could overlap, occur in parallel, occur in a different order, or occur multiple times. In another example, steps may be omitted or replaced by other steps. For example, steps of the method 1400 can be executed in a different order.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method of receiving physical downlink control channels (PDCCHs) in a wireless communication system, the method comprising:
   identifying a first common search space (CSS) set for multicast;
   identifying a second CSS set, other than the first CSS set;
   allocating PDCCH candidates for the second CSS set; and
   allocating remaining PDCCH candidates to the first CSS set for multicast or to a UE-specific search space (USS) set for unicast, wherein:
      when an index of the first CSS set for multicast is smaller than an index of the USS set for unicast, the remaining PDCCH candidates are first allocated to the first CSS set for multicast, and
      when the index of the first CSS set for multicast is larger than the index of the USS set for unicast, the remaining PDCCH candidates are first allocated to the USS set for unicast.

2. The method of claim 1, further comprising:
   identifying non-overlapping control channel elements (CCEs) for the second CSS set;
   allocating the non-overlapping CCEs to the second CSS set; and
   allocating remaining non-overlapping CCEs to the first CSS set or to the USS set.

3. The method of claim 1, wherein a maximum number of PDCCH candidates for allocation is predetermined.

4. The method of claim 1, wherein a radio network temporary identifier (RNTI) for multicast is associated with the CSS set for multicast.

5. The method of claim 1, further comprising:
   identifying a first hybrid automatic repeat request acknowledgment (HARQ-ACK) codebook associated with receptions of PDCCH candidates based on the first CSS set, and
   identifying a second HARQ-ACK codebook associated with receptions of PDCCH candidates based on the USS set,
   wherein a type of the first HARQ-ACK codebook is different than a type of the second HARQ-ACK codebook.

6. The method of claim 5, wherein the first HARQ-ACK codebook and the second HARQ-ACK codebook are jointly encoded.

7. A user equipment (UE) comprising:
   a transceiver; and
   a processor operably coupled to the transceiver, the processor configured to:
      identify a first common search space (CSS) set for multicast;
      identify a second CSS set, other than the first CSS set;
      allocate physical downlink control channel (PDCCH) candidates for the second CSS set; and
      allocate remaining PDCCH candidates to the first CSS set for multicast or to a UE-specific search space (USS) set for unicast, wherein:
         when an index of the first CSS set for multicast is smaller than an index of the USS set for unicast, the remaining PDCCH candidates are first allocated to the first CSS set for multicast, and
         when the index of the first CSS set for multicast is larger than the index of the USS set for unicast, the remaining PDCCH candidates are first allocated to the USS set for unicast.

8. The UE of claim 7, wherein the processor is further configured to:
   identify non-overlapping control channel elements (CCEs) for the second CSS set;
   allocate the non-overlapping CCEs to the second CSS set; and
   allocate remaining non-overlapping CCEs to the first CSS set or to the USS set.

9. The UE of claim 7, wherein a maximum number of PDCCH candidates for allocation is predetermined.

10. The UE of claim 7, wherein a radio network temporary identifier (RNTI) for multicast is associated with the CSS set for multicast.

11. The UE of claim 7, wherein the processor is further configured to:
   identify a first hybrid automatic repeat request acknowledgment (HARQ-ACK) codebook associated with receptions of PDCCH candidates based on the first CSS set, and
   identify a second HARQ-ACK codebook associated with receptions of PDCCH candidates based on the USS set, wherein a type of the first HARQ-ACK codebook is different than a type of the second HARQ-ACK codebook.

12. The UE of claim 11, wherein the first HARQ-ACK codebook and the second HARQ-ACK codebook are jointly encoded.

13. A base station (BS) comprising:
a transceiver; and
a processor operably coupled to the transceiver, the processor configured to:
  identify a first common search space (CSS) set for multicast;
  identify a second CSS set, other than the first CSS set;
  allocate physical downlink control channel (PDCCH) candidates for the second CSS set; and
  allocate remaining PDCCH candidates to the first CSS set for multicast or to a UE-specific search space (USS) set for unicast, wherein:
    when an index of the first CSS set for multicast is smaller than an index of the USS set for unicast, the remaining PDCCH candidates are first allocated to the first CSS set for multicast, and
    when the index of the first CSS set for multicast is larger than the index of the USS set for unicast, the remaining PDCCH candidates are first allocated to the USS set for unicast.

14. The BS of claim 13, wherein the processor is further configured to:
  identify non-overlapping control channel elements (CCEs) for the second CSS set;
  allocate the non-overlapping CCEs to the second CSS set; and
  allocate remaining non-overlapping CCEs to the first CSS set or to the USS set.

15. The BS of claim 13, wherein a maximum number of PDCCH candidates for allocation is predetermined.

16. The BS of claim 13, wherein a radio network temporary identifier (RNTI) for multicast is associated with the CSS set for multicast.

17. The BS of claim 13, wherein:
the transceiver configured to receive:
  first hybrid automatic repeat request acknowledgment (HARQ-ACK) information associated with transmissions of PDCCH candidates based on the first CSS set, and
  second HARQ-ACK information associated with transmissions of PDCCH candidates based on the USS set,
the first HARQ-ACK information is based on a first HARQ-ACK codebook,
the second HARQ-ACK information is based on a second HARQ-ACK codebook, and
a type of the first HARQ-ACK codebook is different than a type of the second HARQ-ACK codebook.

* * * * *